United States Patent
Chen et al.

(10) Patent No.: US 11,425,681 B2
(45) Date of Patent: Aug. 23, 2022

(54) COMMUNICATION METHOD AND COMMUNICATIONS DEVICE

(71) Applicant: HUAWEI TECHNOLOGIES CO., LTD., Guangdong (CN)

(72) Inventors: Lei Chen, Shenzhen (CN); Bingzhao Li, Beijing (CN); Zhenzhen Cao, Beijing (CN); Xuelong Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 110 days.

(21) Appl. No.: 16/936,767

(22) Filed: Jul. 23, 2020

(65) Prior Publication Data

US 2020/0367196 A1  Nov. 19, 2020

Related U.S. Application Data

(63) Continuation of application No. PCT/CN2019/072550, filed on Jan. 21, 2019.

(30) Foreign Application Priority Data

Jan. 26, 2018 (CN) .......................... 201810079748.3

(51) Int. Cl.
*H04W 68/00* (2009.01)
*H04W 76/27* (2018.01)
(Continued)

(52) U.S. Cl.
CPC ......... *H04W 68/005* (2013.01); *H04L 5/0092* (2013.01); *H04W 24/10* (2013.01);
(Continued)

(58) Field of Classification Search
CPC ... H04W 68/005; H04W 76/27; H04W 24/10; H04W 56/001; H04W 72/005; H04L 5/0092
See application file for complete search history.

(56) References Cited

U.S. PATENT DOCUMENTS

2010/0120452 A1  5/2010  Somasundaram et al.
2014/0146759 A1  5/2014  Cho et al.
(Continued)

FOREIGN PATENT DOCUMENTS

CN  101730248 A  6/2010
CN  101803241 A  8/2010
(Continued)

OTHER PUBLICATIONS

International Search Report dated Mar. 27, 2019, issued in counterpart PCT Application No. PCT/CN2019/072550, with English Translation. (11 pages).
(Continued)

*Primary Examiner* — Deepa Belur
(74) *Attorney, Agent, or Firm* — WHDA, LLP

(57) ABSTRACT

This application provides a communication method and a communications device, to change SI (system information). The method includes: receiving, by a terminal device in a radio resource control (RRC)-connected state, a paging message, where the paging message is used to indicate that broadcast information changes, the broadcast information includes at least one of system information (SI), a master information block (MIB), a system information block (SIB 1), and at least one specific SIB in other system information (OSI), the SI includes the MIB, the SIB 1, and the OSI, and the at least one specific SIB in the OSI is a SIB associated with the terminal device; and re-receiving, by the terminal device, broadcast information based on the paging message.

17 Claims, 9 Drawing Sheets

(51) Int. Cl.
*H04L 5/00* (2006.01)
*H04W 24/10* (2009.01)
*H04W 56/00* (2009.01)
*H04W 72/00* (2009.01)

(52) U.S. Cl.
CPC ....... *H04W 56/001* (2013.01); *H04W 72/005* (2013.01); *H04W 76/27* (2018.02)

(56) References Cited

U.S. PATENT DOCUMENTS

| | | | |
|---|---|---|---|
| 2015/0105109 A1 | 4/2015 | Hegde et al. | |
| 2016/0309446 A1* | 10/2016 | Katagiri | H04W 52/0219 |
| 2018/0376452 A1* | 12/2018 | Wei | H04W 76/14 |
| 2019/0045481 A1* | 2/2019 | Sang | H04B 1/713 |
| 2019/0254120 A1* | 8/2019 | Zhang | H04W 24/08 |
| 2019/0289534 A1* | 9/2019 | Ryoo | H04W 80/02 |
| 2020/0084700 A1* | 3/2020 | Wei | H04W 68/08 |
| 2021/0007065 A1* | 1/2021 | Ko | H04L 5/0051 |
| 2021/0127356 A1* | 4/2021 | Agiwal | H04L 5/0053 |
| 2021/0227515 A1* | 7/2021 | Takahashi | H04L 27/2601 |

FOREIGN PATENT DOCUMENTS

| | | | |
|---|---|---|---|
| CN | 102651890 A | | 8/2012 |
| CN | 103179637 A | | 6/2013 |
| CN | 103856923 A | | 6/2014 |
| CN | 107580300 A | | 1/2018 |
| CN | 110022194 A | * | 7/2019 |
| EP | 3739950 A1 | | 11/2020 |
| WO | 2007128223 A1 | | 11/2007 |
| WO | 2010123793 A1 | | 10/2010 |
| WO | 2010125982 A1 | | 11/2010 |
| WO | 2010126409 A1 | | 11/2010 |
| WO | 2015043779 A1 | | 4/2015 |
| WO | 2017176438 A1 | | 10/2017 |

OTHER PUBLICATIONS

Ericsson, "Notification and retrieval of updated SI for a UE in an active DL BWP", 3GPP Tsg-RAN WG2 Nr AH#3 Tdoc R2-1800294, Vancouver, Canada, Jan. 22-26, 2018. (6 pages).
Catt, "Offline summary for AI 6.1.2.2 Remaining details on Remaining Minimum System Information ", 3GPP TSG RAN WG1 Meeting NR#3 R1-1716806, Nagoya, Japan, Sep. 18-21, 2017. (13 pages).
Nokia et al., "System Information update and BWP operation", 3GPP TSG-RAN WG2 NR Ad hoc 1801 R2-1801089, Vancouver, Canada, Jan. 22-26, 2018 (2 pages).
Nokia et al., "On Other System Information delivery", 3GPP TSG-RAN WG1 NR AH #18-01 R1-1800805, Vancouver, Canada, Jan. 22-26, 2018 (4 pages).
Sharp, "Signaling Reduction Method for On-demand SI Delivery and Use Cases", 3GPP TSG RAN WG2 NR Ad Hoc R2-1700474, Spokane, USA, Jan. 17-19, 2017. (4 pages).
Huawei et al., "SI Reception for Connected UE in BWP", 3GPP TSG-RAN2 Meeting #AH-1801 R2-1801194, Vancouver, Canada, Jan. 22-26, 2018 (3 pages).
Office Action dated Feb. 3, 2021, issued in counterpart CN Application No. 201810079748.3, with English Translation. (20 pages).
Extended (Supplementary) European Search Report dated Feb. 3, 2021, issued in counterpart EP Application No. 19744536.4. (13 pages).

* cited by examiner

COMMUNICATION METHOD AND COMMUNICATIONS DEVICE

CROSS-REFERENCE TO RELATED APPLICATIONS

This application is a continuation of International Application No. PCT/CN2019/072550, filed on Jan. 21, 2019, which claims priority to Chinese Patent Application No. 201810079748.3, filed on Jan. 26, 2018. The disclosures of the aforementioned applications are hereby incorporated by reference in their entireties.

TECHNICAL FIELD

This application relates to the communications field, and more specifically, to a communication method and a communications device.

BACKGROUND

Currently, a terminal device in a radio resource control (radio resource control, RRC)-idle (idle) state needs to receive system information (system information, SI), to enter a radio resource control-connected (RRC-connected) state based on the SI. Specifically, after a bandwidth part (bandwidth part, BWP) is introduced, the terminal device may receive a master system information block (mater information block, MIB) by using a synchronization signal (synchronization signal)/a physical broadcast channel (physical broadcast channel, PBCH) block (block). The MIB includes scheduling information of a system information block (system information block, SIB) 1. The terminal device may receive the SIB 1 on a physical downlink shared control information (physical downlink share control channel, PDSCH) based on scheduling information in the MIB. The SIB 1 includes scheduling information of another system message (other system information, OSI). Therefore, the terminal device may receive, on the PDSCH based on the scheduling information in the SIB 1, a SIB needed by the terminal device in the another system message (other system information OSI). Based on information in the SI, the terminal device may perform an RRC connection, and enter the RRC-connected state from the RRC-idle state.

When the terminal device is in the RRC-connected state, the SI may change, but how to change the SI is not defined in the related art. Therefore, a method for changing the SI is urgently needed.

SUMMARY

This application provides a communication method and a communications device, to change SI.

According to a first aspect, a communication method is provided, including: receiving, by a communications apparatus in a radio resource control RRC-connected state, a paging message, where the paging message is used to indicate that broadcast information changes, the broadcast information includes at least one of system information SI, a master system information block MIB, a system information block SIB 1, and at least one specific SIB in other system information OSI, the SI includes the MIB, the SIB 1, and the at least one specific SIB in the OSI is a SIB associated with the communications apparatus; and re-receiving, by the communications apparatus, broadcast information based on the paging message.

Optionally, the communications apparatus is a terminal device.

Therefore, according to the method in an embodiment of this application, for the communications apparatus in the RRC-connected state, a network device may indicate, to the communications apparatus by using the paging message, that the system information changes. In this way, the communications apparatus may receive changed system information based on the paging message, so that a notification of a system information change and receiving of the changed system information are implemented.

In a possible implementation, when the broadcast information includes the SI, or when the broadcast information includes the MIB, the SIB 1, and the at least one specific SIB in the OSI, the re-receiving, by the communications apparatus, broadcast information based on the paging message includes:

re-receiving, by the communications apparatus, a MIB from a physical broadcast channel PBCH in a synchronization signal block SSB based on the paging message;

re-receiving, by the communications apparatus, a SIB 1 from an initial bandwidth part BWP based on scheduling information of the SIB 1 included in the re-received MIB; and re-receiving, by the communications apparatus, at least one specific SIB in OSI from the initial BWP or an active BWP based on scheduling information of the at least one specific SIB in the OSI included in the re-received SIB 1.

In a possible implementation, when the broadcast information includes the MIB, the re-receiving, by the communications apparatus, broadcast information based on the paging message includes:

re-receiving, by the communications apparatus, a MIB from a physical broadcast channel PBCH in a synchronization signal block SSB based on the paging message.

In this way, when only the MIB is changed, the communications apparatus may re-receive only the MIB, and does not need to receive other information in SI, so that an operation of the communications apparatus can be simplified.

In a possible implementation, when the broadcast information further includes the SIB 1, the re-receiving, by the communications apparatus, broadcast information based on the paging message further includes:

re-receiving, by the communications apparatus, a SIB 1 from an initial bandwidth part BWP based on scheduling information of the SIB 1 included in the re-received MIB.

In this way, when only the MIB and the SIB 1 are changed, the communications apparatus only needs to re-receive a MIB and the SIB 1, and does not need to re-receive at least one specific SIB in OSI, so that an operation of the communications apparatus can be simplified.

In a possible implementation, when the broadcast information further includes the at least one specific SIB in the OSI, the re-receiving, by the communications apparatus, broadcast information based on the paging message further includes:

re-receiving, by the communications apparatus, at least one specific SIB in OSI from the initial bandwidth part BWP or an active BWP based on scheduling information of the at least one specific SIB in the OSI.

In this way, when only the at least one specific SIB in the OSI is changed, the communications apparatus only needs to re-receive the at least one specific SIB in the OSI, and does not need to re-receive other information in SI, so that an operation of the communications apparatus can be simplified.

In a possible implementation, the re-receiving, by the communications apparatus, a MIB from a physical broadcast channel PBCH in a synchronization signal block SSB based on the paging message includes:

re-receiving, by the communications apparatus, the MIB from the SSB based on the paging message and a first time pattern, where the first time pattern is used to indicate a first moment and first duration, the first moment is a start moment of each first switching period, at the start moment of the first switching period, the communications apparatus switches from the active BWP to the SSB, and a length of the first switching period is the first duration.

Specifically, after a next modification period arrives, the communications apparatus may switch from the active BWP to the SSB at the start moment (that is, the first moment) of each first switching period, and receive the MIB from the SSB. At an end moment of the first switching period, or after the communications apparatus switches to the SSB for the first duration, if the communications apparatus does not receive the MIB, the communications apparatus switches back to the active BWP. Then, the communications apparatus may switch to the SSB again in a next switching period to receive the MIB.

In a possible implementation, the first time pattern is determined based on a measurement GAP of the SSB.

For the measurement GAP of the SSB, reference may be made to the related art, and details are not described in this application.

For example, the first moment of the first time pattern may be defined as a start moment of the measurement GAP, and the first duration may be duration of the measurement GAP. In the measurement GAP, the communications apparatus may receive the MIB from the PBCH when measuring the SSB.

For another example, the first moment may be a moment earlier or later than a preset time of the measurement GAP, and the first duration may be 1.5 times the measurement GAP.

In a possible implementation, the re-receiving, by the communications apparatus, the MIB from the SSB based on the paging message and a first time pattern includes:

switching, by the communications apparatus, from the active BWP to the SSB in each first switching period based on the paging message and the first time pattern, until the communications apparatus re-receives the MIB from the SSB, or until a quantity of times that the communications apparatus switches from the active BWP to the SSB reaches a first preset value.

In other words, a termination condition for receiving the MIB by the communications apparatus is that the MIB is received or the quantity of switching times reaches the first preset value.

In a possible implementation, the method further includes:

switching, by the communications apparatus, to the active BWP after re-receiving the MIB, and sending a second dedicated RRC message to the network device, where the second dedicated RRC message is used to indicate that the communications apparatus re-receives the MIB.

In this way, the network device may determine, based on the received second dedicated RRC message, that the communications apparatus successfully receives the MIB resent by the network device. When the second dedicated RRC message is not received, the network device may learn that the communications apparatus has not received (or successfully received) the MIB, and can learn that the communications apparatus switches to another place (for example, the SSB) at a specific time. Therefore, the network device does not schedule data for the communications apparatus at the specific time. After the communications apparatus successfully receives the MIB, the network device may schedule the data for the communications apparatus at the specific time, so that resource utilization can be improved, and flexibility of scheduling for the communications apparatus can be improved.

If the network device does not receive the second dedicated RRC message within a predetermined time (for example, the predetermined time herein may be a product of the first preset value and the first duration), the network device may consider that the communications apparatus fails to receive the MIB (for example, a MIB #1) resent by the network device. In this case, the network device may send the MIB #1 to the communications apparatus in another manner. For example, the network device may send the MIB #1 to the communications apparatus by using a dedicated RRC message. In addition, if the communications apparatus does not receive (or successfully receive) the MIB #1 within the predetermined time, it may be considered that SI update fails in this case, and the network device and the communications apparatus may perform an SI update failure operation in the related art.

In a possible implementation, when the broadcast information includes the SIB 1, the re-receiving, by the communications apparatus, broadcast information based on the paging message includes: re-receiving, by the communications apparatus, a SIB 1 from an initial bandwidth part BWP based on the paging message and scheduling information of the SIB 1 included in the MIB.

In this way, when only the SIB 1 is changed, the communications apparatus may re-receive only the SIB 1, and does not need to receive other information in SI, so that an operation of the communications apparatus can be simplified.

In a possible implementation, when the broadcast information further includes the at least one specific SIB in the OSI, the re-receiving, by the communications apparatus, broadcast information based on the paging message further includes:

re-receiving, by the communications apparatus, at least one specific SIB in OSI from the initial BWP or an active BWP based on scheduling information of the at least one specific SIB in the OSI included in the re-received SIB 1.

In this way, when only the SIB 1 and the at least one specific SIB in the OSI are changed, the communications apparatus may re-receive only a SIB 1 and the at least one specific SIB in the OSI, and does not need to receive a MIB, so that an operation of the communications apparatus can be simplified.

In a possible implementation, when the broadcast information includes the at least one specific SIB in the OSI, the re-receiving, by the communications apparatus, broadcast information based on the paging message includes:

re-receiving, by the communications apparatus, at least one specific SIB in OSI from an initial bandwidth part BWP or an active BWP based on the paging message and scheduling information of the at least one specific SIB in the OSI included in the SIB 1.

In this way, when only the at least one specific SIB in the OSI is changed, the communications apparatus may re-receive only the at least one specific SIB in the OSI, and does not need to receive a MIB, so that an operation of the communications apparatus can be simplified.

In a possible implementation, the re-receiving, by the communications apparatus, a SIB 1 from the initial BWP based on the paging message includes:

re-receiving, by the communications apparatus, the SIB 1 from the initial BWP based on the paging message and a second time pattern, where the second time pattern is used to indicate a second moment and second duration, the second moment is a start moment of each second switching period, at the start moment of the second switching period, the communications apparatus switches from the active BWP or the SSB to the initial BWP, and a length of the second switching period is equal to the second duration.

In a possible implementation, the re-receiving, by the communications apparatus, the SIB 1 from the initial BWP based on the paging message and a second time pattern includes:

switching, by the communications apparatus, from the active BWP or the SSB to the initial BWP in each second switching period based on the paging message and the second time pattern, until the communications apparatus re-receives the SIB 1 from the initial BWP, or until a quantity of times that the communications apparatus switches from the active BWP or the SSB to the initial BWP reaches a second preset value.

In other words, a termination condition for receiving the SIB 1 by the communications apparatus is that the SIB 1 is received or the quantity of switching times reaches the second preset value.

In a possible implementation, the method further includes:

switching, by the communications apparatus, to the active BWP after re-receiving the SIB 1, and sending a third dedicated RRC message to the network device, where the third dedicated RRC message is used to indicate that the communications apparatus re-receives the SIB 1.

In this way, the network device may determine, based on the received third dedicated RRC message, that the communications apparatus successfully receives the SIB 1 resent by the network device. When the third dedicated RRC message is not received, the network device may learn that the communications apparatus has not received (or successfully received) the SIB 1, and can learn that the communications apparatus switches to another place (for example, the initial BWP) at a specific time. Therefore, the network device does not schedule data for the communications apparatus at the specific time. After the communications apparatus successfully receives the SIB 1, the network device may schedule the data for the communications apparatus at the specific time, so that resource utilization can be improved, and flexibility of scheduling for the communications apparatus can be improved.

If the network device does not receive the third dedicated RRC message within a predetermined time (for example, the predetermined time herein may be a product of the second preset value and the second duration), the network device may consider that the communications apparatus fails to receive the SIB 1 (for example, a SIB 1 #1) resent by the network device. In this case, the network device may send the SIB 1 #1 to the communications apparatus in another manner. For example, the network device may send the SIB 1 #1 to the communications apparatus by using a dedicated RRC message.

In a possible implementation, the re-receiving, by the communications apparatus, broadcast information based on the paging message includes:

re-receiving, by the communications apparatus, the broadcast information on an SI resource of the active BWP based on the paging message.

Specifically, an SI resource is a resource specially used to send broadcast information. When the broadcast information changes, the network device may resend broadcast information on the SI resource, so that the communications apparatus may re-receive the broadcast information on the SI resource.

Optionally, the SI resource may be a fixed resource on the active BWP, or may be a fixed resource on the initial BWP. Further, there may be one or more SI resources. By using an example in which the active BWP includes an SI resource, one or more SI resources may be reserved on the active BWP and are used to transmit the broadcast information.

It should be understood that sizes and quantities of SI resources included in different BWPs or BWPs of different communications apparatuses may be the same or may be different. This is not limited in this embodiment of this application.

It should be further understood that the SI resource may occupy a same time-frequency resource in BWPs of some or all of communications apparatuses in a same cell. In this way, some or all of the communications apparatuses may receive the changed broadcast information on the SI resource. This SI resource design can save resources, and in addition, after some or all of the communications apparatuses receive the broadcast information resent by the network device, the network device may stop sending the changed broadcast information. Then, the SI resource may be used for another purpose, so that resource utilization can be improved.

It should be noted that the "SI" resource herein is only a name, and is the resource specially used to send the broadcast information. The SI resource may also be referred to as a virtual BWP or the like. This is not limited in this embodiment of this application.

In addition, the SI resource may be further used to send a paging message.

In a possible implementation, the method further includes:

sending, by the communications apparatus, a fourth dedicated RRC message to the network device after re-receiving the broadcast information, where the fourth dedicated RRC message is used to indicate that the communications apparatus re-receives the broadcast information.

In this way, if receiving the fourth dedicated RRC message, the network device may learn that the communications apparatus has successfully received the broadcast information resent by the network device.

In a possible implementation, before the re-receiving, by the communications apparatus, broadcast information based on the paging message, the method further includes:

determining, by the communications apparatus, whether the active bandwidth part BWP includes the initial BWP; and the re-receiving, by the communications apparatus, broadcast information based on the paging message or the first dedicated RRC message includes:

if the communications apparatus determines that the active BWP does not include the initial BWP, re-receiving by the communications apparatus, the broadcast information based on the paging message.

Specifically, the communications apparatus first determines whether the active BWP includes the initial BWP. If the active BWP does not include the initial BWP, the communications apparatus re-receives the broadcast information based on the paging message and the method in this embodiment of this application. If the active BWP includes the initial BWP, the communications apparatus may receive the broadcast information based on a method for receiving SI in the related art.

According to a second aspect, a communication method is provided, including: sending by a communications apparatus, a paging message to a terminal device in a radio resource control RRC-connected state, where the paging message is used to indicate that broadcast information changes, the broadcast information includes at least one of system information SI, a master system information block MIB, a system information block SIB 1, and at least one specific SIB in other system information OSI, the SI includes the MIB, the SIB 1, and the OSI, and the at least one specific SIB in the OSI is a SIB associated with the terminal device; and resending, by the communications apparatus, broadcast information to the terminal device.

Therefore, according to the method in an embodiment of this application, for the terminal device in the RRC-connected state, the communications apparatus may indicate, to the terminal device by using the paging message, that the system information changes. In this way, the terminal device may receive changed system information based on the paging message, so that a notification of a system information change and receiving of the changed system information are implemented.

In a possible implementation, the method further includes:

resending, by the communications apparatus, the broadcast information to the terminal device on an SI resource of an active bandwidth part BWP.

In a possible implementation, the resending, by the communications apparatus, broadcast information to the terminal device includes: resending, by the communications apparatus, a MIB by sending a synchronization signal block SSB, where the resent MIB includes scheduling information of a SIB 1;

resending, by the communications apparatus, the SIB 1 on an initial bandwidth part BWP based on the scheduling information of the SIB 1, where the resent SIB 1 includes scheduling information of at least one specific SIB in OSI; and resending, by the communications apparatus, the at least one specific SIB in the OSI on the initial bandwidth part BWP or an active BWP based on the scheduling information of the at least one specific SIB in the OSI.

In a possible implementation, the method further includes:

receiving, by the communications apparatus, a second dedicated RRC message, where the second dedicated RRC message is used to indicate that the terminal device re-receives the MIB.

In a possible implementation, the method further includes:

receiving, by the communications apparatus, a third dedicated RRC message, where the third dedicated RRC message is used to indicate that the terminal device re-receives the SIB 1.

In a possible implementation, the method further includes:

receiving, by the communications apparatus, a fourth dedicated RRC message, where the fourth dedicated RRC message is used to indicate that the terminal device re-receives the broadcast information.

For the second aspect, specifically refer to the related description in the first aspect. For brevity, details are not described herein again.

According to a third aspect, a communication method is provided, including: receiving, by a communications apparatus in a radio resource control RRC-connected state, a first dedicated RRC message, where the first dedicated RRC message includes changed system information SI and an effective time of the changed SI, the changed SI includes at least one of a chanced master system information block MIB, a changed system information block SIB 1, and at least one specific SIB in changed other system information OSI, and the at least one specific SIB in the OSI is a SIB associated with the communications apparatus; and determining, by the communications apparatus, the changed SI and the effective time of the changed SI based on the first dedicated RRC message.

Therefore, according to the communication method in an embodiment of this application, a network device may add the changed SI and the effective time of the changed SI to an RRC message, so that the communications apparatus can learn of the changed SI and the effective time of the changed SI based on the RRC message, to change the SI.

In a possible implementation, before the receiving, by a communications apparatus in a radio resource control RRC-corrected state, a first dedicated RRC message, the method further includes:

sending, by the communications apparatus, a subscription message to the network device, where the subscription message is used to indicate at least one SIB associated with the communications apparatus, and the at least one SIB associated with the communications apparatus includes the at least one specific SIB in the OSI.

In a possible implementation, the method further includes:

sending, by the communications apparatus, an acknowledgment message to the network device after receiving the first dedicated RRC message, where the acknowledgment message is used to indicate that the communications apparatus receives the first dedicated RRC message.

In this way, the network device does not need to add all changed SIBs in the OSI to a first RRC message, but only needs to add a changed SIB associated with the communications apparatus, thereby reducing signaling overheads.

According to a fourth aspect, a communication method is provided, including: generating, by a communications apparatus, first radio resource control dedicated radio resource control RRC signaling, where the first dedicated RRC message includes changed system information SI and an effective time of the changed SI, the changed SI includes at least one of a changed master system information block MIB, a changed system information block SIB 1, and at least one specific SIB in changed other system information OSI, and the at least one specific SIB in the OSI is a SIB associated with a terminal device; and sending, by the communications apparatus, the first dedicated RRC message to the terminal device.

In a possible implementation, before the generating, by a communications apparatus, first radio resource control dedicated radio resource control RRC signaling, the method further includes:

receiving, by the communications apparatus, a subscription message sent by the terminal device, where the subscription message is used to indicate at least one SIB associated with the terminal device, and the at least one SIB associated with the terminal device includes the at least one specific SIB in the OSI.

In a possible implementation, the method further includes:

receiving, by the communications apparatus, an acknowledgment message sent by the terminal device, where the acknowledgment message is used to indicate that the terminal device receives the first dedicated RRC message.

For the fourth aspect, specifically refer to the related description in the third aspect. For brevity, details are not described herein again.

According to a fifth aspect, a communications device is provided, and is configured to perform the method in any one of the first aspect or the possible implementations of the first aspect. The communications device may be further configured to perform the method in any one of the third aspect or the possible implementations of the third aspect.

According to a sixth aspect, a communications device is provided, and is configured to perform the method in any one of the second aspect or the possible implementations of the second aspect. The communications device may be further configured to perform the method in any one of the fourth aspect or the possible implementations of the fourth aspect.

According to a seventh aspect, this application provides a communications device. The communications device includes a memory, a processor, a transceiver, and a computer program that is stored in the memory and that is executable on the processor. When executing the computer program, the processor performs the method in any one of the first aspect or the possible implementations of the first aspect, or when executing the computer program, the processor performs the method in any one of the third aspect or the possible implementations of the third aspect.

According to an eighth aspect, this application provides a communications device. The network device includes a memory, a processor, a transceiver, and a computer program that is stored in the memory and that is executable on the processor. When executing the computer program, the processor performs the method in any one of the second aspect or the possible implementations of the second aspect, or when executing the computer program, the processor performs the method in any one of the fourth aspect or the possible implementations of the fourth aspect.

According to a ninth aspect, tins application provides a computer-readable medium, configured to store a computer program, where the computer program includes an instruction used to perform the method in any one of the first aspect to the fourth aspect or the possible implementations of the first aspect to the fourth aspect.

According to a tenth aspect, this application provides a computer program product including an instruction. When the computer program product is run on a computer, the computer is enabled to perform the method in any one of the first aspect to the fourth aspect or the possible implementations of the first aspect to the fourth aspect.

According to an eleventh aspect, this application provides a communications apparatus, including an input interface, an output interface, at least one processor, and a memory. The input interface, the output interface, the processor, and the memory communicate with each other by using an internal connection path, the processor is configured to execute code in the memory, and when the code is executed, the processor is configured to perform the method in any one of the first aspect to the fourth aspect or the possible implementations of the first aspect to the fourth aspect.

DESCRIPTION OF EMBODIMENTS

Figure 1:
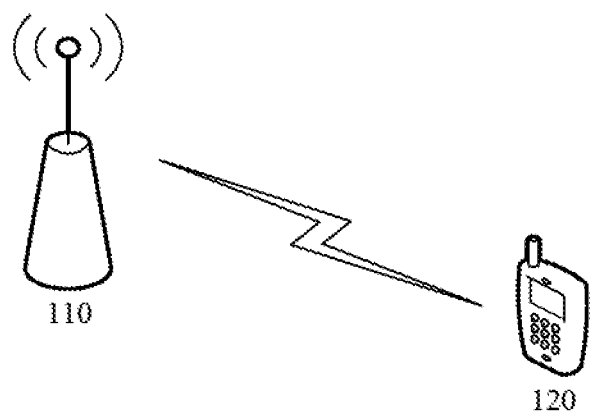
FIG. 1 is a schematic diagram of an architecture of a communications system according to an embodiment of this application.

The following describes the technical solutions of this application with reference to the accompanying drawings.

The technical solutions of embodiments of this application may be applied to various communications systems, such as a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communications system, a future 5th generation (5th generation, 5G) system, and a new radio (new radio, NR) system.

It should be understood that one communications apparatus in the embodiments of this application may be a terminal device, and the other communications apparatus may be a network device.

The terminal device in the embodiments of this application may be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (public land mobile network, PLMN). This is not limited in the embodiments of this application.

The network device in the embodiments of this application may be a base transceiver station (base transceiver station, BTS) in the global system for mobile communications (global system of mobile communications, GSM) or the code division multiple access (code division multiple access, CDMA) system, a NodeB (NodeB, NB) in the wideband code division multiple access (wideband code division multiple access, WCDMA) system, an evolved NodeB (evolutional NodeB, eNB or eNodeB) in the LTE system, or a radio controller in a cloud radio access network (cloud radio access network, CRAN) scenario. Alternatively, the network device may be a relay station, an access point, a vehicle-mounted device, a wearable device, a network device in a future 5G network, or a network device in a future evolved PLMN network. This is not limited in the embodiments of this application.

FIG. 1 is a schematic diagram of a communications system applicable to embodiments of this application. As shown in FIG. 1, the communications system includes at least two communications devices, for example, a network device 110 and a terminal device 120. Data communication may be performed between the network device 110 and the terminal device 120 through a wireless connection.

Specifically, the network device provides a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell (small cell). The small cell herein may include a metro cell (metro cell), a micro cell (micro cell), a pico cell (pico cell), a femto cell (femto cell), and the like. Such small cells have features of a small coverage area and low transmit power, and are applicable to providing a high-speed data transmission service. Moreover, the cell may alternatively be a hyper cell (hypercell). The hyper cell uses a user centric no cell radio access (user centric no cell radio access, UCNC) technology. To be specific, the terminal device no longer accesses a particular fixed physical base station (for example, a TRP), but accesses a logical entity (logical entity, LE) including a group of TRPs to obtain a service, and the logical entity may be referred to as a hyper cell. A boundary of the hyper cell is flexible and may vary with network load and user distribution. All TRPs in the hyper cell are transparent to the terminal device, and the terminal device only needs to access the hyper cell based on a hyper cell ID to obtain services of the TRPs in the hyper cell and is not fixedly connected to a particular TRP.

To facilitate understanding of the embodiments of this application, some concepts or terms in this application are first briefly described.

(1) SSB

The SSB in this application is a synchronization signal (synchronizing signal) physical broadcast channel (physical broadcast channel, PBCH) block, that is, the SSB is the SS/PBCH block. In other words, in this application, the SSB and the SS/PBCH block may be replaced with each other.

The SSB may be a cell defined SSB (cell defined SSB). On a broadband of a cell, there are some cell defined SSBs, which broadcast the SSB. The SSB includes a PSS (Primary Synchronization Signal), an SSS (Secondary Synchronization Signal), and a PBCH, so that a terminal device camps on the cell. The PBCH carries a MIB in SI, and the MIB may carry scheduling information of a SIB 1. A network device may receive the SIB 1 based on the scheduling information.

(2) BWP

Because an NR frequency band is wider than an LTE frequency band, in a current spectrum division manner, the NR frequency band is at least 100 MHz. Different terminal devices have different radio frequency capabilities and can support different maximum bandwidths. Therefore, a concept of the BWP is introduced. By allocating a part of a spectrum on a broadband to a terminal device for use, a bandwidth supported by the terminal device may be adapted. In addition, by configuring a plurality of BWPs with different bandwidths for the terminal device, flexible scheduling of the terminal device and energy saving of the terminal device can be implemented.

Figure 2:
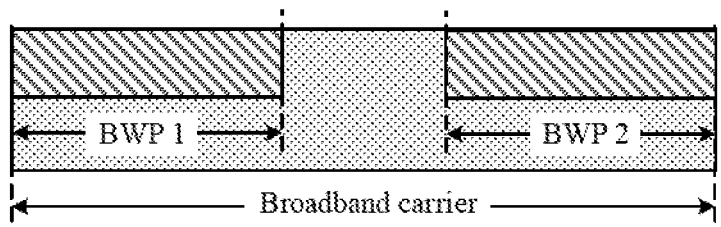
FIG. 2 is a schematic diagram of a BWP.

FIG. 2 is a schematic diagram of a BWP. As shown in FIG. 2, a BWP 1 and a BWP 2 are BWPs configured by a network device for a specific terminal device. Generally, a bandwidth capability of the terminal device is less than a bandwidth of an entire cell or a broadband carrier, but is greater than or equal to a bandwidth of a specific BWP configured for the terminal device.

(3) Initial BWP

When a terminal device accesses a cell or a broadband carrier in an RRC-idle state, a BWP used when the terminal device performs initial access is referred to as an initial BWP (initial BWP). Alternatively, it may be understood that the terminal device performs random access on the initial BWP.

The initial BWP may also be understood as a bandwidth of a location of a SIB 1 indicated by a MIB in an SSB, and may be defined as the initial BWP. On the initial BWP, the terminal device may obtain the SIB 1 and OSI, and may listen to a paging message.

(4) Active BWP

When a service arrives at the terminal device, the network device schedules the terminal device from the initial BWP to a BWP whose bandwidth matches the service of the terminal device. This BWP is referred to as an active BWP.

Based on a current standard, common search space (common search space) that is of a Type (Type) 0A and a Type 2 and that is used to receive physical downlink control information (Physical downlink control channel, PDCCH) is configured on the active BWP. That is, the terminal device may receive the paging message and the OSI on the current active BWP.

(5) System information SI, in the embodiments of this application, the SI may include a minimum system message (minimum system information, MSI) and OSI, the MSI includes a MIB and RMSI (remaining minimum system information), and the RMSI is also referred to as a SIB 1. Therefore, in other words, the SI includes the MIB, the SIB 1, and the OSI.

In addition, if the RMSI needs to be segmented subsequently, the RMSI may be named a SIB 1, a SIB 2, and the like. In this case, the OSI includes SIBs after the SIB 2 and the like.

The OSI may include all SIBs except the SIB 1. For example, the OSI may include a SIB 2 to a SIB 14.

It should be understood that a specific terminal device does not need all SIBs in the OSI, but may need only some SIBs in the OSI, that is, need only SIBs related to the terminal device. Therefore, when receiving a SIB in the OSI, the terminal device may receive only a SIB related to the terminal device, and does not receive a SIB unrelated to the terminal device. However, this is not limited in the embodiments of this application. For example, the terminal device may also receive all the SIBs in the OSI. The following describes a method for receiving SI by a terminal device in an RRC-idle state.

Figure 3:
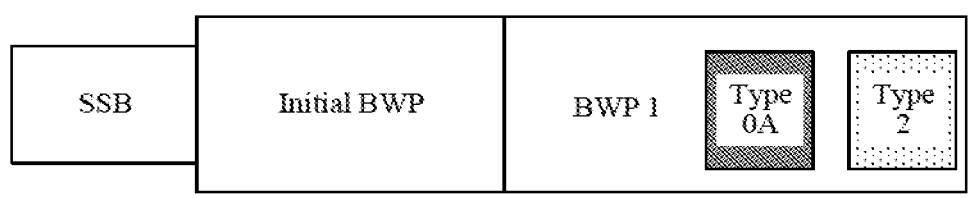
FIG. 3 is a schematic diagram of receiving SI by a terminal device in an RRC-idle state according to an embodiment of this application.

As shown in FIG. 3, the terminal device in the RRC-idle state may receive a MIB by using a PBCH in an SSB, and receive a SIB 1 on an initial BWP based on scheduling information of the SIB 1 in the MIB. The SIB 1 includes scheduling information of OSI. Therefore, the terminal device may receive, from the initial BWP based on the scheduling information in the SIB 1, a SIB needed by the terminal device in the OSI. Based on the foregoing information, the terminal device may perform an RRC connection, and enter an RRC-connected state from the RRC-idle state. When a service arrives at the terminal device, a network device schedules the terminal device from the initial BWP to a BWP whose bandwidth matches the service of the terminal device, that is, an active BWP. Then, the terminal device can perform service transmission with the network device.

It should be understood that FIG. 3 is merely an example for description, and constitutes no limitation on this application. For example, the initial BWP in FIG. 3 does not include an SSB, but this application does not exclude a case in which the initial BWP includes the SSB. In this application, the initial BWP may alternatively include the SSB. However, this is not specifically limited in the embodiments of this application.

When the terminal device is in the RRC-connected state, the SI may change, but how to change the SI is not defined in the related art. Therefore, a method for changing the SI is urgently needed.

In view of this, this application provides a communication method, to change SI. The following describes the communication method in this application in detail with reference to the accompanying drawings.

Figure 4:
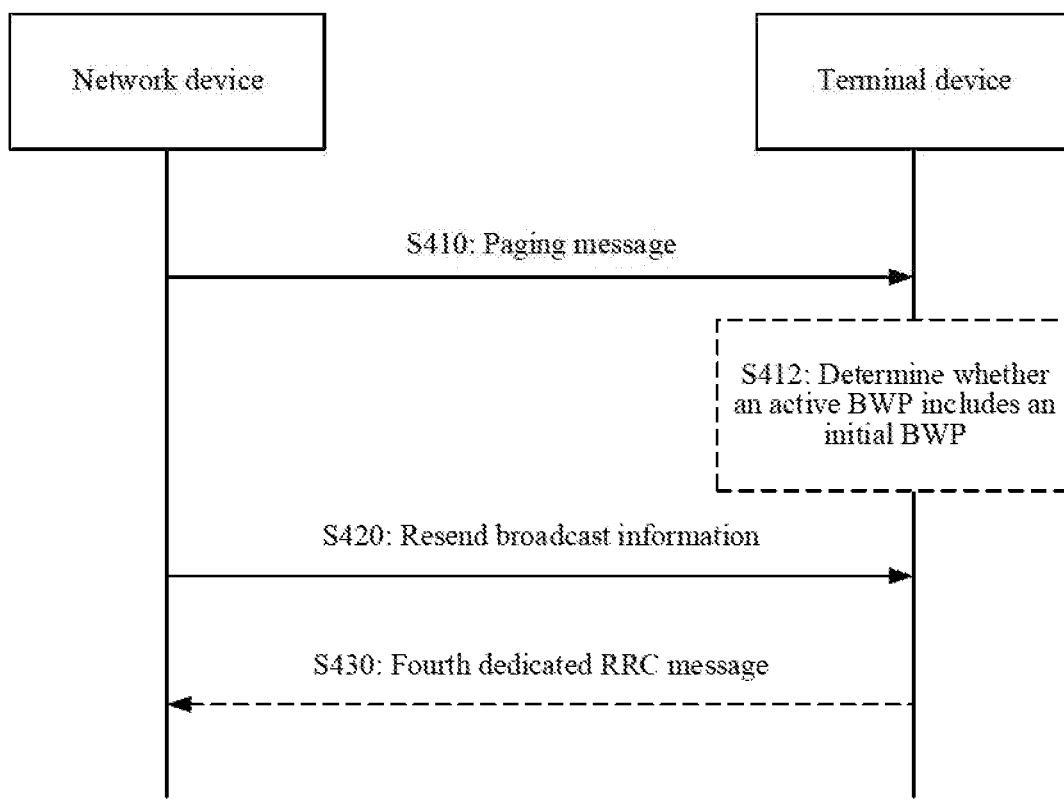
FIG. 4 is a schematic flowchart of a communication method according to an embodiment of this application.

FIG. 4 is a schematic flowchart of a communication method according to an embodiment of this application. As shown in FIG. 4, the method may include S410 and S420. Optionally, the method may further include S412 and S430.

S410: A network device sends a paging (paging) message to a terminal device in an RRC-connected state. Correspondingly, the terminal device receives the paging message.

Specifically, when broadcast information changes, the network device may indicate, to the terminal device in the RRC-connected state by using the paging message, that the broadcast information changes. The broadcast information includes at least one of SI, a MIB, a SIB 1, and at least one specific SIB in OSI, and the at least one specific SIB in the OSI is a SIB associated with the terminal device. In other words, the paging message indicates that the SI changes, the MIB changes, the SIB 1 changes, and the at least one specific SIB in the OSI changes, that is, any one or wore of the four cases occur.

It should be understood that, in addition to that the at least one specific SIB in the OSI changes, if another SIB in the OSI changes, the paging message may further indicate that the another SIB changes.

Optionally, the network device may send the paging message on an active BWP or an initial BWP. However, this is not limited in this embodiment of this application. For example, the network device may further send a paging message on another BWP.

S420: The terminal device re-receives broadcast information based on the paging message. In other words, the terminal device receives changed broadcast information based on the paging message.

Correspondingly, the network device resends the broadcast information. In other words, the network device sends the changed broadcast information.

Specifically, the paging message indicates that a specific one of the four types of information: the SI, the MIB, the SIB 1, and the at least one specific SIB in the OSI changes, and then, the network device may resend the specific type of information. For example, if the paging message indicates that the SI changes, the network device resends SI; if the paging message indicates that the MIB and the SIB 1 change, the network device resends a MIB and a SIB 1; or if the paging message indicates that the at least one specific SIB in the OSI changes, the network device may resend at least one specific SIB in OSI.

It should be understood that the network device may further resend another changed SIB in the OSI. However, this is not limited in this embodiment of this application. For example, the at least one specific SIB in the OSI is a SIB 4 and a SIB 5. If the SIB 4 and the SIB 5 change, the broadcast information resent by the network device includes a SIB 4 and a SIB 5 herein. If a SIB 6 changes, the broadcast information resent by the network device may further include a SIB 6.

Therefore, according to the method in this embodiment of this application, for the terminal device in the RRC-connected state, the network device may indicate, to the terminal device by using the paging message, that the system information changes. In this way, the terminal device may receive changed system information based on the paging message, so that a notification of a system information change and receiving of the changed system information are implemented.

Optionally, the method may further include the following step:

S430: After re-receiving the broadcast information, the terminal device sends a fourth dedicated RRC message to the network device, where the fourth dedicated RRC message is used to indicate that the terminal device re-receives the broadcast information.

In this way, if receiving the fourth dedicated RRC message, the network device may learn that the terminal device has successfully received the broadcast information resent by the network device.

Optionally, before the terminal device re-receives the broadcast information based on the paging message, the method further includes the following step:

S412: The terminal device determines whether the active BWP includes the initial BWP.

Specifically, the terminal device first determines whether the active BWP includes the initial BWP. If the active BWP does not include the initial BWP, the terminal device re-receives the broadcast information based on the paging message and the method in this embodiment of this application. If the active BWP includes the initial BWP, the terminal device may receive the broadcast information based on a method for receiving SI in the related art.

Optionally, in this embodiment of this application, S420 may be implemented in a manner 1 or manner 2. The following describes the two implementations in detail.

Manner 1

The terminal device re-receives broadcast information on an SI resource.

Specifically, an SI resource is a resource specially used to send broadcast information. When the broadcast information changes, the network device may resend broadcast information on the SI resource, so that the terminal device may re-receive the broadcast information on the SI resource.

Optionally, the SI resource may be a fixed resource on the active BWP, or may be a fixed resource on the initial BWP. Further, there may be one or more SI resources. By using an example in which the active BWP includes an SI resource, one or more SI resources may be reserved on the active BWP and are used to transmit the broadcast information.

It should be understood that sizes and quantities of SI resources included in different BWPs or BWPs of different terminal devices may be the same or may be different. This is not limited in this embodiment of this application.

It should be further understood that the SI resource may occupy a same time-frequency resource in BWPs of some or all of terminal devices in a same cell. In this way, some or all of the terminal devices may receive the changed broadcast information on the SI resource. This SI resource design can save resources, and in addition, after some or all of the terminal devices receive the broadcast information resent by the network device, the network device may stop sending the changed broadcast information. Then, the SI resource may be used for another purpose, so that resource utilization can be improved.

It should be noted that the "SI resource" herein is only a name, and is the resource specially used to send the broadcast information. The SI resource may also be referred to as a virtual BWP or the like. This is not limited in this embodiment of this application.

In addition the SI resource may be further used to send a paging message.

Manner 2

Based on a location at which the terminal device receives the broadcast information when the terminal device is in an RRC-idle state, the terminal device re-receives broadcast information. For different content in the broadcast information, that is, different changed information, a detailed description is given.

Case 1

The broadcast information includes the SI. That is, the SI changes.

In this embodiment of this application, that the SI changes means that one or more of the MTB, the SIB 1, and the at least one specific SIB in the OSI may change. After receiving the paging message, the terminal device cannot determine a specific changed one of the three types of information. Therefore, the terminal device needs to receive all the three types of information.

In this case, S420 is specifically as follows.

The terminal device re-receives a MIB from a PBCH in an SSB based on the paging message, then re-receives a SIB 1 from the initial BWP based on scheduling information of the SIB 1 included in the re-received MIB, and finally, re-receives at least one specific SIB in OSI from the initial BWP or the active BWP based on scheduling information of the at least one specific SIB in the OSI included in the re-received SIB 1.

It should be understood that, a location from which the terminal device receives the at least one specific SIB in the OSI depends on a configuration of search space of the OSI. If the search space of the OSI is configured on the active BWP, the terminal device may receive the OSI from the active BWP. If the search space of the OSI is configured on the initial BWP, the terminal device may receive the OSI from the initial BWP.

Case 2

The broadcast information includes only the MIB. That is, only the MIB changes.

In this embodiment of this application, that only the MIB changes means that other content in the MIB except for the scheduling information of the SIB 1 may change.

In this case, S420 is specifically as follows.

The terminal device re-receives a MIB from a PBCH in an SSB based on the paging message.

It should be noted that the terminal device does not need to re-receive a SIB 1 and at least one specific SIB in OSI. However, this is not limited in this embodiment of this application. For example, the terminal device may also re-receive the SIB 1 and the at least one specific SIB in the OSI.

Case 3

The broadcast information includes the MIB and the SIB 1. That is, only the MIB and the SIB 1 change.

In this case, S420 is specifically as follows.

The terminal device re-receives a MIB from a PBCH in an SSB based on the paging message, and then re-receives a SIB 1 from the initial BWP based on scheduling information of the SIB 1 included in the re-received MIB.

It should be noted that the terminal device does not need to re-receive at least one specific SIB in OSI. However, this is not limited in this embodiment of this application. For example, the terminal device may also re-receive the at least one specific SIB in the OSI.

Case 4

The broadcast information includes the NUB and the at least one specific SIB in the OSI. That is, only the MIB and the at least one specific SIB in the OSI change.

In this case, S420 is specifically as follows.

The terminal device re-receives a MIB from a PBCH in an SSB based on the paging message. Then, the terminal device re-receives at least one specific SIB in OSI from the initial BWP or the active BWP based on scheduling information of the at least one specific SIB in the OSI in a SIB 1 received last time.

It should be noted that the terminal device does not need to re-receive a SIB 1. However, this is not limited in this embodiment of this application. For example, the terminal device may also re-receive the SIB 1, but the terminal device still uses the scheduling information of the at least one specific SIB in the OSI in the SIB 1 received last time, or scheduling information of the at least one specific SIB in the OSI in the SIB 1 re-received by the terminal device is the same as the scheduling information of the at least one specific SIB in the OSI in the SIB 1 received last time.

Case 5

The broadcast information includes the SIB 1. That is, only the SIB 1 changes.

In this embodiment of this application, that only the SIB 1 changes means that other content in the SIB 1 except for scheduling information of a SIB in the OSI may change.

In this case, S420 is specifically as follows.

The terminal device re-receives a SIB 1 from the initial BWP based on the paging message and scheduling information of the SIB 1 included in a MIB received last time.

It should be noted that the terminal device does not need to re-receive a MIB and at least one specific SIB in OSI. However, this is not limited in this embodiment of this application. For example, the terminal device may also re-receive the MIB and the at least one specific SIB in the OSI, but the terminal device still uses the scheduling information of the SIB 1 in the MIB received last time, or scheduling information of the SIB 1 in the MIB re-received by the terminal device is the same as the scheduling information of the SIB 1 in the MIB received last time.

Case 6

The broadcast information includes the SIB 1 and the at least one specific SIB in the OSI. That is, only the SIB 1 and the at least one specific SIB in the OSI change.

In this case, S420 is specifically as follows.

The terminal device re-receives a SIB 1 from the initial BWP based on the paging message and scheduling information of the SIB 1 included in a MIB received last time, and then re-receives at least one specific SIB in OSI from the initial BWP or the active BWP based on scheduling information of the at least one specific SIB in the OSI included in the re-received SIB 1.

It should be noted that the terminal device does not need to re-receive a MIB. However, this is not limited in this embodiment of this application. For example, the terminal device may also re-receive the MIB, but the terminal device still uses the scheduling information of the SIB 1 in the MIB received last time, or scheduling information of the SIB 1 in the MIB re-received by the terminal device is the same as the scheduling information of the SIB 1 in the MIB received last time.

Case 7

The broadcast information includes only the at least one specific SIB in the OSI. That is, only the at least one specific SIB in the OSI changes.

In this case, S420 is specifically as follows.

The terminal device re-receives at least one specific SIB in OSI from the initial BWP or the active BWP based on the paging message and scheduling information of the at least one specific SIB in the OSI included in a SIB 1 received last time.

It should be noted that the terminal device does not need to re-receives a MIB and a SIB 1. However, this is not limited in this embodiment of this application. For example, the terminal device may also re-receive the MIB and the SIB 1, but the terminal device still uses the scheduling information of the at least one specific SIB in the SIB 1 received last time, or scheduling information of the at least one specific SIB in the SIB 1 re-received by the terminal device is the same as the scheduling information of the at least one specific SIB in the SIB 1 received last time.

Case 8

The broadcast information includes the MIB, the SIB 1, and the at least one specific SIB in the OSI. That is, the three types of information: the MIB, the SIB 1, and the at least one specific SIB in the OSI change.

In this case, S420 is specifically as follows.

The terminal device re-receives a MIB from a PBCH in an SSB based on the paging message, then re-receives a SIB 1 from the initial BWP based on scheduling information of the SIB 1 included in the re-received MIB, and finally, re-receives at least one specific SIB in OSI from the initial BWP or the active BWP based on scheduling information of the at least one specific SIB in the OSI included in the re-received SIB 1.

Case 8 is similar to Case 1. The terminal device needs to re-receive the three types of information: the MIB, the SIB 1, and the at least one specific SIB in the OSI, and use the scheduling information in the MIB and the scheduling information in the SIB 1.

According to the communication method in this embodiment of this application, the terminal device may perform one of the foregoing eight cases based on an indication of the paging message, to receive the changed broadcast information.

Optionally, in the foregoing, when the terminal device re-receives the MIB from the PBCH in the SSB based on the paging message, the terminal device may re-receive the MIB from the SSB based on the paging message and a first time pattern.

The first time pattern is used to indicate a first moment and first duration. The first moment is a time at which the terminal device switches from the active BWP to the SSB in each first switching period, the first duration is duration for which the terminal device stays on the SSB after the terminal device switches from the active BWP to the SSB, and a length of the first switching period is the first duration.

Specifically, after a next modification period arrives, the terminal device may switch from the active BWP to the SSB at a start moment (that is, the first moment) of each first switching period, and receive the MIB from the SSB. At an end moment of the first switching period, or after the terminal device switches to the SSB for the first duration, if the terminal device does not receive the MIB, the terminal device switches back to the active BWP. Then, the terminal device may switch to the SSB again in a next switching period to receive the MIB.

Figure 5:
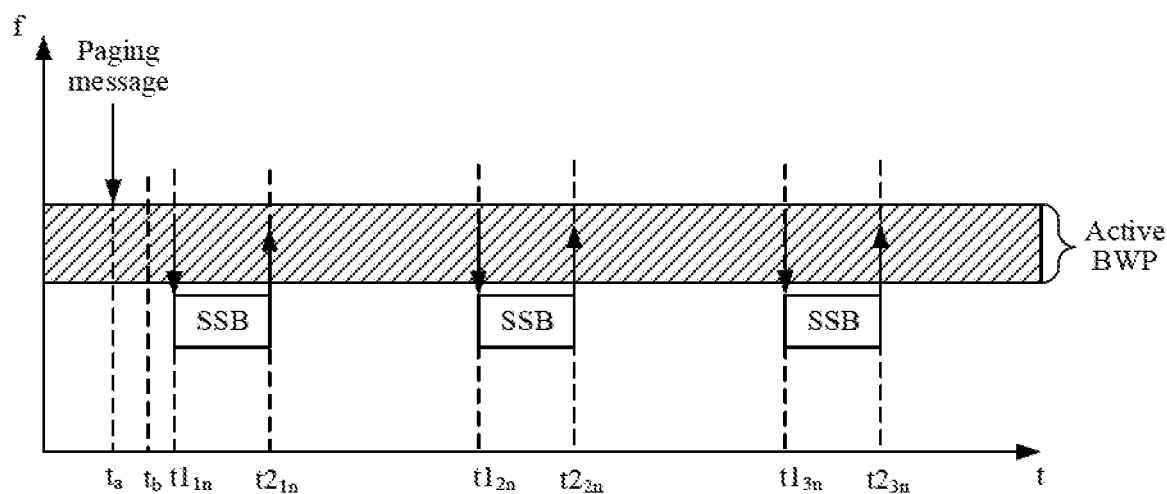
FIG. 5 is a schematic flowchart of a specific embodiment of a communication method according to an embodiment of this application.

For example, FIG. 5 is a schematic diagram in which a terminal device switches from an active BWP to au SSB and receives a MIB. As shown in FIG. 5, the terminal device receives a paging message at a moment $t_a$, and a start moment of a next modification period is $t_b$. In a time period from $t_a$ to $t_b$, a network device still sends broadcast information before a change to the terminal device, and the network device sends modified broadcast information to the terminal device only after the moment $t_b$. The terminal device may receive (or detect) the MIB from the SSB at a start moment $t1_{1n}$ of the first switching period after the moment $t_b$. At an end moment $t2_{1n}$ of the first switching period, if the terminal device has not received the MIB, the terminal device switches back to the active BWP. Then, the terminal device receives (or detects) the MIB from the SSB at a start moment $t1_{2n}$ of the second first switching period. If the terminal device receives the MIB in the second first switching period, the terminal device may immediately switch back to the active BWP. If the terminal device has not received the MIB in the second first switching period, the terminal device switches back to the active BWP. Then, the terminal device receives (or detects) the MIB from the SSB at a start moment $t1_{3n}$ of the third first switching period.

It should be further understood that a modification period in this application is a modification period of SI.

In an optional implementation of a first pattern, the first time pattern is determined based on a measurement GAP of the SSB.

For example, the first moment of the first time pattern may be defined as a start moment of the measurement GAP, and the first duration may be duration of the measurement GAP. In the measurement GAP, the terminal device may receive the MIB from the PBCH when measuring the SSB.

For another example, the first moment may be a moment earlier or later than a preset time of the measurement GAP, and the first duration may be 1.5 times the measurement GAP.

For the measurement GAP of the SSB, reference may be made to the related art, and details are not described in this embodiment of this application.

Further, that the terminal device re-receives the MIB from the SSB based on the paging message and a first time pattern includes:

switching, by the terminal device, from the active BWP to the SSB in each first switching period based on the paging message and the first time pattern, until the terminal device re-receives the MIB from the SSB, or until a quantity of times that the terminal device switches from the active BWP to the SSB reaches a first preset value.

In other words, a termination condition for receiving the MIB by the terminal device is that the MIB is received or the quantity of switching times reaches the first preset value.

Specifically, the terminal device switches to the SSB in each first switching period to receive the MIB. Before an end moment of a particular first switching period or when a time after the terminal device switches to the SSB does not reach the first duration, if the terminal device has received the MIB, the terminal device may immediately switch back to the active BWP. Alternatively, the terminal device may switch back to the active BWP at the end moment of the first switching period. After this, if the MIB does not change again, the terminal device may not need to switch to the SSB again to receive the MIB. Alternatively, the terminal device switches to the SSB in each first switching period to receive the MIB. If the terminal device has not received the MIB after a predetermined quantity of times (the predetermined quantity of times is the first preset value), the terminal device 110 longer switches to the SSB to receive the MIB.

Still further, after re-receiving the MIB, the terminal device may switch to the active BWP, and send a second dedicated RRC message to the network device, and the second dedicated RRC message is used to indicate that the terminal device re-receives the MIB.

In this way, the network device may determine, based on the received second dedicated RRC message, that the terminal device successfully receives the MIB resent by the network device. When the second dedicated RRC message is not received, the network device may learn that the terminal device has not received (or successfully received) the MIB, and can learn that the terminal device switches to another place (for example, the SSB) at a specific time. Therefore, the network device does not schedule data for the terminal device at the specific time. After the terminal device successfully receives the MIB, the network device may schedule the data for the terminal device at the specific time, so that resource utilization can be improved, and flexibility of scheduling for the terminal device can be improved.

If the network device does not receive the second dedicated RRC message within a predetermined time (for example, the predetermined time herein may be a product of the first preset value and the first duration), the network device may consider that the terminal device fails to receive the MIB (for example, a MIB #1) resent by the network device. In this case, the network device may send the MIB #1 to the terminal device in another manner. For example, the network device may send the MIB #1 to the terminal device by using a dedicated RRC message. In addition, if the terminal device does not receive (or successfully receive) the MIB #1 within the predetermined time, it may be considered that SI update fails in this case, and the network device and the terminal device may perform an SI update failure operation in the related art.

Optionally, in the foregoing, when re-receiving the SIB 1 from the initial BWP based on the paging message, the terminal device may re-receive the SIB 1 from the initial BWP based on the paging message and a second time pattern.

The second time pattern is used to indicate a second moment and second duration. The second moment is a time at which the terminal device switches from the active BWP or the SSB to the initial BWP in each second switching period, the second duration is duration for which the terminal device stays on the initial BWP after the terminal device switches from the active BWP or the SSB to the initial BWP, and a length of the second switching period is equal to the second duration.

It should be understood that if the terminal device further needs to re-receive the MIB before re-receiving the SIB 1, the terminal device may directly switch from the SSB to the initial BWP. Alternatively, the terminal device may first switch from the SSB back to the active BWP, and then switch from the active BWP to the initial BWP. If the terminal device does not need to re-receive the MIB before re-receiving the SIB 1, the terminal device may directly switch from the active BWP to the initial BWP. Specifically, after a next modification period arrives, the terminal device may switch from the active BWP or the SSB to the initial BWP at a start moment (that is, the second moment) of each second switching period, and receive the SIB 1 from the initial BWP. At an end moment of the second switching period, or after the terminal device switches to the initial BWP for the second duration, if the terminal device does not receive the SIB 1, the terminal device switches back to the active BWP or the SSB. Then, the terminal device may switch to the initial BWP again in a next switching period to receive the SIB 1.

Figure 6:
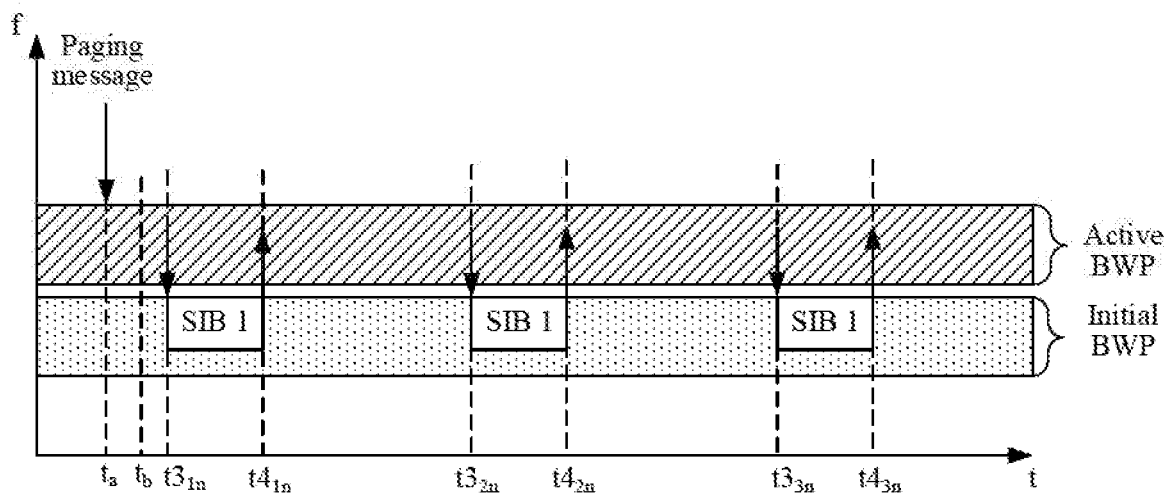
FIG. 6 is a schematic flowchart of a specific embodiment of a communication method according to an embodiment of this application.

For example, FIG. 6 is a schematic diagram in which a terminal device switches from an active BWP to an initial BWP and receives a SIB 1. As shown in FIG. 6, the terminal device receives a paging message at a moment $t_a$, and a start moment of a next modification period is $t_b$. In a time period from $t_a$ to $t_b$, a network device still sends broadcast information before a change to the terminal device, and the network device sends modified broadcast information to the terminal device only after the moment $t_b$. The terminal device may receive (or detect) the SIB 1 from the initial BWP at a start moment $t3_{1n}$ of the first second switching period after the moment $t_b$. At an end moment $t4_{1n}$ of the first second switching period, if the terminal device has not received the SIB 1, the terminal device switches back to the active BWP. Then, the terminal device receives (or detects) the SIB 1 from the initial BWP at a start moment $t3_{2n}$ of the second second switching period. If the terminal device receives the SIB 1 in the second second switching period, the terminal device may immediately switch back to the active BWP. If the terminal device has not received the SIB 1 in the second second switching period, the terminal device switches back to the active BWP. Then, the terminal device receives (or detects) the MIB from the SSB at a start moment $t3_{3n}$ of the third second switching period.

Further, that the terminal device re-receives the SIB 1 from the initial BWP based on the paging message and a second time pattern includes:

switching, by the terminal device, from the active BWP or the SSB to the initial BWP in each second switching period based on the paging message and the second time pattern, until the terminal device re-receives the SIB 1 from the initial BWP, or until a quantity of times that the terminal device switches from the active BWP or the SSB to the initial BWP reaches a second preset value.

In other words, a termination condition for receiving the SIB 1 by the terminal device is that the SIB 1 is received or the quantify of switching times reaches the second preset value.

Specifically, the terminal device switches to the initial BWP in each second switching period to receive the SIB 1. Before an end moment of a particular second switching period or when a time after the terminal device switches to the initial BWP does not reach the second duration, if the terminal device has received the SIB 1, the terminal device may immediately switch back to the active BWP, or may switch back to the active BWP at the end moment of the second switching period. After this, if the SIB 1 does not change again, the terminal device may not need to switch to the initial BWP to receive the SIB 1. Alternatively, the terminal device switches to the initial BWP in each second switching period to receive the SIB 1. If the terminal device has not received the SIB 1 after a predetermined quantity of times (the predetermined quantity of times is the second preset value), the terminal device no longer switches to the initial BWP to receive the SIB 1.

Still further, after re-receiving the SIB 1, the terminal device may switch to the active BWP, and send a third dedicated RRC message to the network device, and the third dedicated RRC message is used to indicate that the terminal device re-receives the SIB 1.

In this way, the network device may determine, based on the received third dedicated RRC message, that the terminal device successfully receives the SIB 1 resent by the network device. When the third dedicated RRC message is not received, the network device may learn that the terminal device has not received (or successfully received) the SIB 1, and can learn that the terminal device switches to another place (for example, the initial BWP) at a specific time. Therefore, the network device does not schedule data for the terminal device at the specific time. After the terminal device successfully receives the SIB 1, the network device may schedule the data for the terminal device at the specific time, so that resource utilization can be improved, and flexibility of scheduling for the terminal device can be improved.

If the network device does not receive the third dedicated RRC message within a predetermined time (for example, the predetermined time herein may be a product of the second preset value and the second duration), the network device may consider that the terminal device fails to receive the SIB 1 (for example, a SIB 1 #1) resent by the network device. In this case, the network device may send the SIB 1 #1 to the terminal device in another manner. For example, the network device may send the SIB 1 #1 to the terminal device by using a dedicated RRC message.

Figure 7:
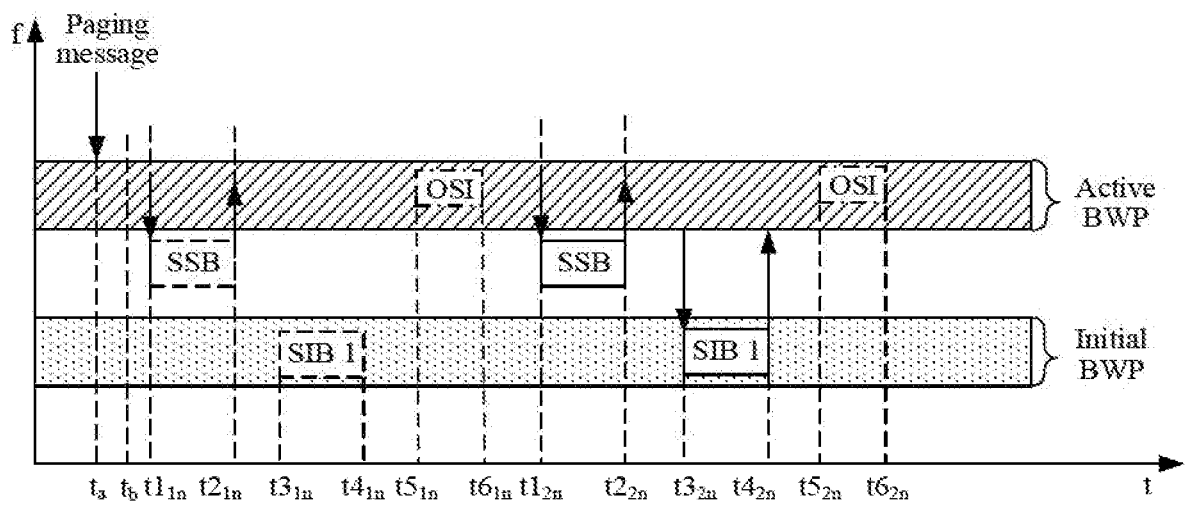
FIG. 7 is a schematic flowchart of a specific embodiment of a communication method according to an embodiment of this application.

With reference to FIG. 5, FIG. 6, and related descriptions. FIG. 7 is a schematic diagram in which a terminal device re-receives SI.

As shown in FIG. 7, a network device sends a paging message at a moment $t_a$. From a start moment $t_b$ of a next modification period, the network device may send modified SI. For example, the modified SI includes a modified MIB (the MIB in the figure), a modified SIB 1 (the SIB 1 in the figure), and modified OSI (the OSI in the figure). Specifically, the network device may send an SSB in each first switching period $t1_{in}$ to $t2_{in}$ (i=1, 2, ... ), where the SSB includes the modified MIB, send the modified SIB 1 on an initial BWP in each second switching period $t3_{in}$ to $t4_{in}$, and send the modified OSI on an active BWP in each third switching period $t5_{in}$ to $t6_{in}$. The terminal device may receive the modified MIB from the SSB at a start moment $t1_{1n}$ of the first switching period. At an end moment $t2_{1n}$ of the first switching period, if the terminal device has not received the modified MIB, the terminal device switches back to the active BWP. Because the terminal device does not receive the modified MIB, and cannot learn of scheduling information of the modified SIB 1, the terminal device needs to continue to receive the modified MIB from the SSB at a start moment $t1_{2n}$ of the second first switching period. The terminal device can receive the modified SIB 1 based on the scheduling information of the modified SIB 1 only after the terminal device receives the modified MIB. In FIG. 7, the terminal device receives the modified MIB in the second first switching period, and then receives the modified SIB 1 in the second second switching period based on the scheduling information of the modified SIB 1 in the modified MIB. The terminal device receives the modified SIB 1 in the second second switching period, and then receives, in the second third switching period, at least one specific SIB in the modified OSI based on scheduling information of the at least one specific SIB in the modified OSI in the modified SIB 1.

It should be understood that in the embodiments shown in FIG. 5 to FIG. 7, the switching periods do not overlap. However, it should be understood that the switching periods may alternatively partially or completely overlap. This is not specifically limited in this embodiment of this application. It should be further understood that when an end moment of a switching period is the same as or slightly different from a start moment of another switching period, the terminal device may alternatively directly switch from the switching period to the another switching period, and does not need to switch back to the active BWP.

It should be further understood that in this application, the network device may send the information in the SI based on a period and/or a time domain resource for sending the SI in the related art. However, this is not limited in this embodiment of this application. For example, the network device may send the MIB by using a period for sending the MIB in the related art and a time domain resource for sending the MIB in the related art. For example, the network device may alternatively send the information in the SI by using a period and/or a time domain resource of the SI defined in a subsequent standard. Finally, it should be noted that if the initial BWP includes the SSB, the SSB and the SIB 1 may be directly received from the initial BWP. In other words, the terminal device switches to the SSB, that is, switches to the initial BWP.

Figure 8:
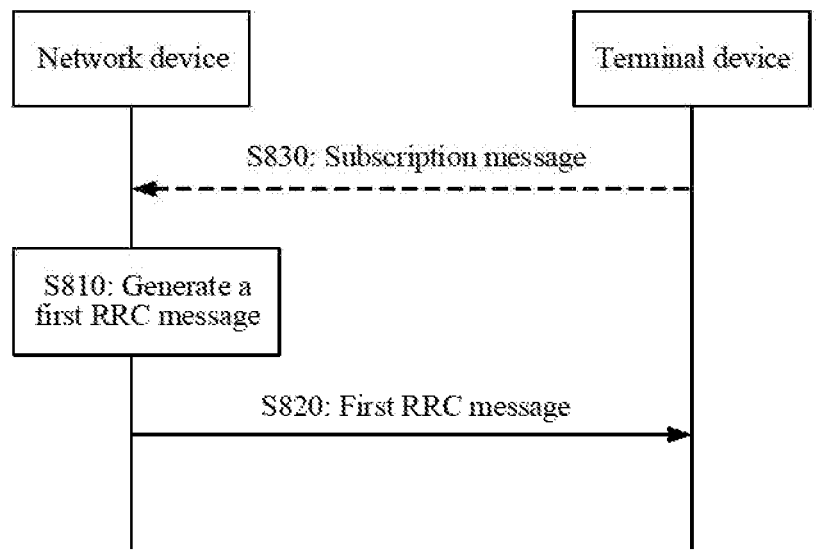
FIG. 8 is a schematic flowchart of another communication method according to an embodiment of this application.

FIG. 8 is a schematic flowchart of a communication method according to another embodiment of this application. As shown in FIG. 8, the method includes S810 and S820. Optionally, the method may further include S830.

S810: A network device generates a first dedicated RRC message.

The first dedicated RRC message includes changed SI and an effective time of the changed SI. The changed SI includes at least one of a changed master system information block MIB, a changed system information block SIB 1, and at least one specific SIB in changed other system information OSI. The at least one specific SIB in the OSI is a SIB associated with the terminal device.

S820: The network device sends the first dedicated RRC message to a terminal device in an RRC-idle state.

Correspondingly, the terminal device receives the first dedicated RRC message, and may determine changed broadcast information and an effective time of the changed broadcast information based on the first dedicated RRC message.

Specifically, when any one or more of a MIB, a SIB 1, or at least one specific SIB in the OSI changes, the network device may add, to the first RRC message, correspondingly changed information and an effective time of the changed information. For example, if only the MIB changes, the changed MIB may be carried in the first RRC message. If the SIB 1 and the at least one specific SIB in the OSI change, the changed SIB 1 and the at least one specific SIB in the changed OSI may be carried in the first RRC message. The terminal device may obtain information in the changed SI by using the received first RRC signaling.

Therefore, according to the communication method in this embodiment of this application, the network device may add the changed SI and the effective time of the changed SI to an RRC message, so that the terminal device can learn of the changed SI and the effective time of the changed SI based on the RRC message, to change the SI.

Optionally, before S810, the method may further include the following step:

S830: The terminal device sends a subscription message to the network device.

The subscription message is used to indicate at least one SIB associated with the terminal device, and the at least one SIB associated with the terminal device includes the at least one specific SIB in the OSI.

In this way, the network device does not need to add all changed SIBs in the OSI to the first RRC message, but only needs to add a changed SIB associated with the terminal device, thereby reducing signaling overheads.

It should be understood that the examples in FIG. 5 to FIG. 7 are merely intended to help a person skilled in the art to understand the embodiments of this application, and are not intended to limit the embodiments of this application to specific scenarios in the examples. A person skilled in the art can apparently make various equivalent modifications or changes according to the examples in FIG. 5 to FIG. 7, and such modifications or changes also fall within the scope of the embodiments of this application.

The foregoing describes in detail the communication method according to an embodiment of this application with reference to FIG. 4 to FIG. 8. The following specifically describes a communications device according to an embodiment of this application.

Figure 9:
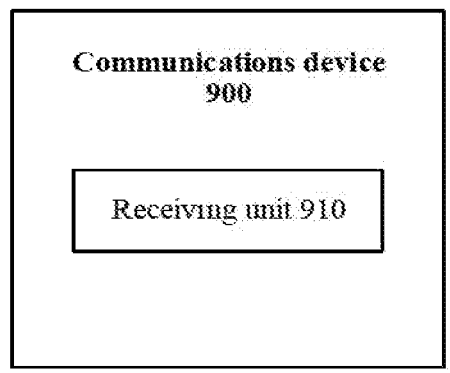
FIG. 9 is a schematic diagram of an architecture of a terminal device according to all embodiment of this application.

FIG. 9 is a schematic block diagram of a communications device according to an embodiment of this application. As shown in FIG. 9, the communications device 900 includes a receiving unit 910.

The receiving unit 910 is configured to receive a paging message, where the paging message is used to indicate that broadcast information changes, the broadcast information includes at least one of system information SI, a master system information block MIB, a system information block SIB 1, and at least one specific SIB in other system information OSI, the SI includes the NUB, the SIB 1, and the OSI, and the at least one specific SIB in the OSI is a SIB associated with the communications device.

The receiving unit 910 is further configured to re-receive broadcast information based on the paging message.

Optionally, when the broadcast information includes the SI, or when the broadcast information includes the MIB, the SIB 1, and the at least one specific SIB in the OSI, the receiving unit 910 is specifically configured to:

re-receive a MIB from a physical broadcast channel PBCH in a synchronization signal block SSB based on the paging message;

re-receive a SIB 1 from an initial bandwidth part BWP based on scheduling information of the SIB 1 included in the re-received MIB; and re-receive at least one specific SIB in OSI from the initial BWP or an active BWP based on scheduling information of the at least one specific SIB in the OSI included in the re-received SIB 1.

Optionally, the receiving unit 910 is specifically configured to:

re-receive the MIB from the SSB based on the paging message and a first time pattern, where the first time pattern is used to indicate a first moment and first duration, the first moment is a time at which the communications device switches from the active BWP to the SSB in each first switching period, the first duration is duration for which the communications device stays on the SSB after the communications device switches from the active BWP to the SSB, and a length of the first switching period is the first duration.

Optionally, the first time pattern is determined based on a measurement GAP of the SSB.

Optionally, the receiving unit 910 is specifically configured to:

switch from the active BWP to the SSB in each first switching period based on the paging message and the first time pattern, until the communications device re-receives the MIB from the SSB, or until a quantity of times that the communications device switches from the active BWP to the SSB reaches a first preset value.

Optionally, the communications device further includes:

a first switching unit, configured to switch to the active BWP after the receiving unit re-receives the MTB; and a first sending unit, configured to send a second dedicated RRC message to a network device, where the second dedicated RRC message is used to indicate that the communications device re-receives the MIB.

Optionally, the receiving unit 910 is specifically configured to:

re-receive the SIB 1 from the initial BWP based on the paging message and a second time pattern, where the second time pattern is used to indicate a second moment and second duration, the second moment is a time at which the communications device switches from the active BWP or the SSB to the initial BWP in each second switching period, the second duration is duration for which the communications device stays on the initial BWP after the communications device switches from the active BWP or the SSB to the initial BWP, and a length of the second switching period is equal to the second duration.

Optionally, the receiving unit 910 is specifically configured to:

switch from the active BWP or the SSB to the initial BWP in each second switching period based on the paging message and the second time pattern, until the communications device re-receives the SIB 1 from the initial BWP, or until a quantity of times that the communications device switches from the active BWP or the SSB to the initial BWP reaches a second preset value.

Optionally, the communications device further includes:

a second switching unit, configured to switch to the active BWP after the receiving unit re-receives the SIB 1; and a second sending unit, configured to send a third dedicated RRC message to the network device, where the third dedicated RRC message is used to indicate that the communications device re-receives the SIB 1.

Optionally, the receiving unit 910 is specifically configured to:

re-receive the broadcast information on an SI resource of the active BWP based on the paging message.

It should be understood that the communications device 900 herein is presented in a form of a functional unit. The term "unit" herein may refer to an application-specific integrated circuit (application specific integrated circuit, ASIC), an electronic circuit, a processor (for example, a shared processor, a special purpose processor, or a group processor) configured to execute one or more software or firmware programs, a memory, a combined logic circuit, and/or another proper component that supports the described function. In an optional example, a person skilled in the art may understand that the communications device 900 may specifically be the terminal device in the foregoing method embodiments, and the communications device 900 may be configured to perform the procedures and/or the steps corresponding to the terminal device in the foregoing method embodiments. To avoid repetition, details are not described herein again.

Figure 10:
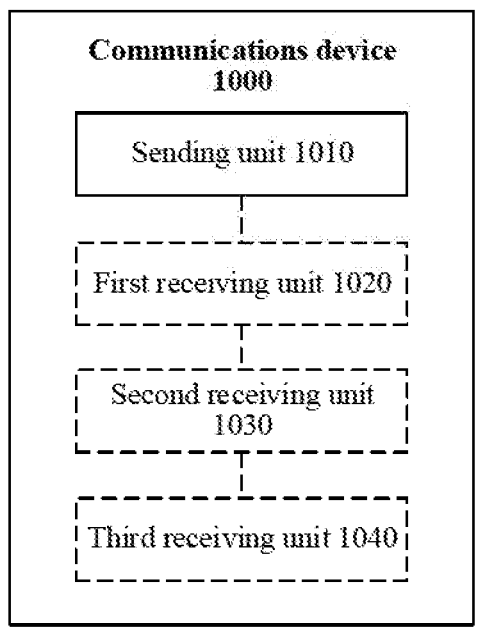
FIG. 10 is a schematic diagram of an architecture of a network device according to an embodiment of this application.

FIG. 10 is a schematic block diagram of a communications device according to an embodiment of this application. As shown in FIG. 10, the communications device 1000 includes a sending unit 1010. Optionally, the communications device 1000 may further include a first receiving unit 1020, a second receiving unit 1030, and a third receiving unit 1040.

The sending unit 1010 is configured to send a paging message to a terminal device in a radio resource control RRC-connected state, where the paging message is used to indicate that broadcast information changes, the broadcast information includes at least one of system information SI, a master system information block MIB, a system information block SIB 1, and at least one specific SIB in other system information OSI, the SI includes the MIB, the SIB 1, and the OSI; and the at least one specific SIB in the OSI is a SIB associated with the terminal device.

The sending limit 1010 is further configured to resend broadcast information to the terminal device.

Optionally, the sending unit 1010 is specifically configured to:

resend a MIB by sending a synchronization signal block SSB, where the resent MIB includes scheduling information of a SIB 1;

resend the SIB 1 on an initial bandwidth pail BWP based on the scheduling information of the SIB 1, where the resent SIB 1 includes scheduling information of at least one specific SIB in OSI; and resend the at least one specific SIB in the OSI on the initial bandwidth part BWP or an active BWP based on the scheduling information of the at least one specific SIB in the OSI.

Optionally, the communications device further includes:

the first receiving unit 1020, configured to receive a second dedicated RRC message, where the second dedicated RRC message is used to indicate that the terminal device re-receives the MIB.

Optionally, the communications device further includes:

the second receiving unit 1030, configured to receive a third dedicated RRC message, where the third dedicated RRC message is used to indicate that the terminal device re-receives the SIB 1.

Optionally, the communications device further includes:

the third receiving unit 1040, configured to receive a fourth dedicated RRC message, where the fourth dedicated RRC message is used to indicate that the terminal device re-receives the broadcast information.

It should be understood that the communications device 1000 herein is presented in a form of a functional unit. The term "unit" herein may refer to an ASIC, an electronic circuit, a processor (for example, a shared processor, a special purpose processor, or a group processor) configured to execute one or more software or firmware programs, a memory, a combined logic circuit, and/or another proper component that supports the described function. In an optional example, a person skilled in the art may understand that the communications device 1000 may specifically be the network device in the foregoing method embodiments, and the communications device 1000 may be configured to perform the procedures and/or the steps corresponding to the network device in the foregoing method embodiments. To avoid repetition, details are not described herein again.

Figure 11:
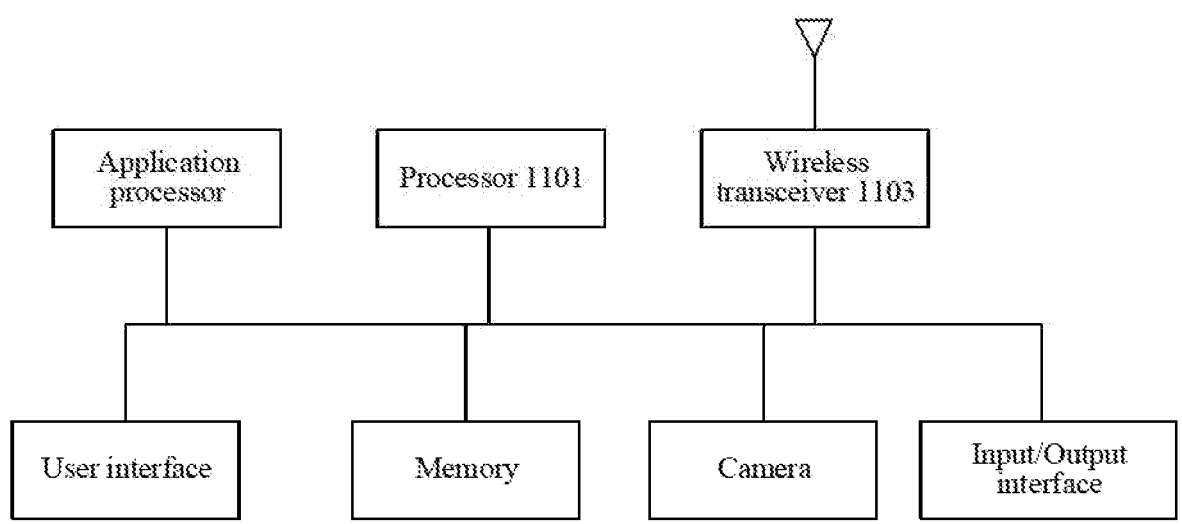
FIG. 11 is a schematic diagram of an architecture of another communications device according to an embodiment of this application.

When a communications device in an embodiment is a terminal device, reference may be made to the device shown in FIG. 11, and the device includes a processor 1101, an application processor, a memory, a user interface, and some other elements (including devices such as a power supply not shown). The receiving unit 910 in FIG. 9 and the first sending unit and/or the second sending unit described in the embodiment in FIG. 9 may be a wireless transceiver 1103 in FIG. 11, and the wireless transceiver 1103 implements a corresponding function by using an antenna. The first switching unit and/or the second switching unit described in the embodiment in FIG. 9 may be the processor 1101 in FIG. 11. It may be understood that the elements shown in the figure are merely examples, and are not necessary elements for completing the embodiments.

Figure 12:
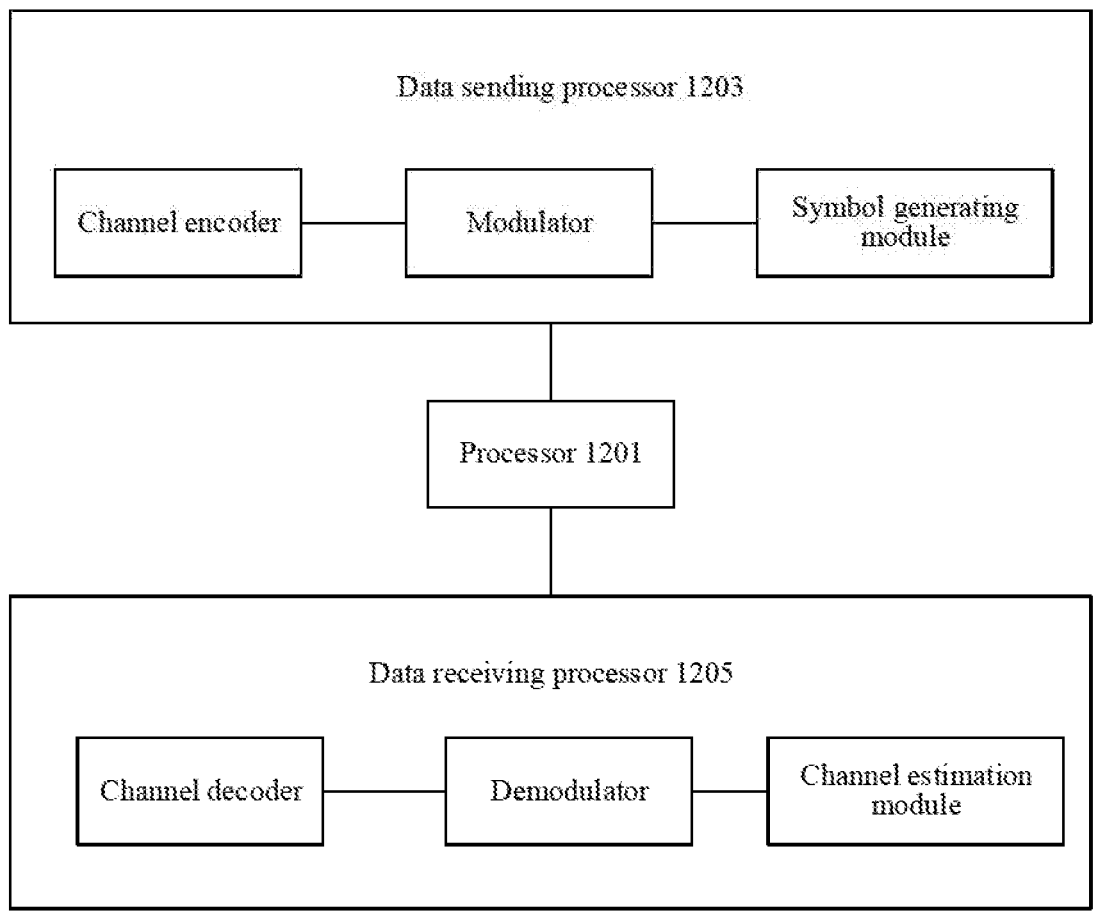
FIG. 12 is a schematic diagram of an architecture of another communications device according to an embodiment of this application.

When a communications device in an embodiment is a terminal device, reference may be made to a device in FIG. 12. For example, the device can implement a function similar to that of the processor in FIG. 11. In FIG. 12, the device includes a processor 1201, a data sending processor 1203, and a data receiving processor 1205. In FIG. 12, the receiving unit 910 in FIG. 9 and the first sending unit and/or the second sending unit described in the embodiment in FIG. 9 may be the data receiving processor 1205 in FIG. 12. The first switching unit and/or the second switching unit described in the embodiment in FIG. 9 may be the processor 1201 in FIG. 12. Although a channel encoder and a channel decoder are shown in the figure, it may be understood that these modules are merely examples, and do not constitute a limitation on the embodiments.

Figure 13:
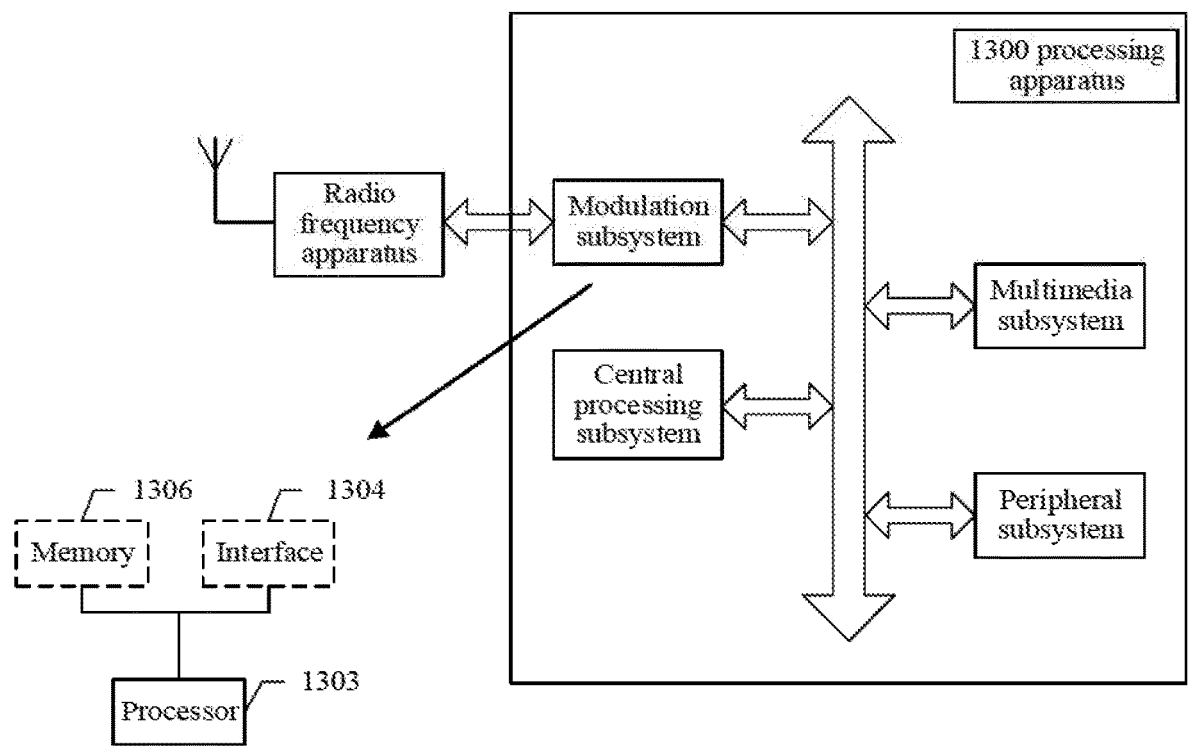
FIG. 13 is a schematic diagram of an architecture of a processing apparatus according to an embodiment of this application.

FIG. 13 shows another implementation of au embodiment of this application. A processing apparatus 1300 includes modules such as a modulation subsystem, a central processing subsystem, and a peripheral subsystem. A communications device in this embodiment may be used as the modulation subsystem in the processing apparatus 1300. Specifically, the modulation subsystem may include a processor 1303 and an interface 1304. The processor 1303 implements a function of the processor and the interface 1304 implements functions of the sending units and/or the receiving units. In another variation, the modulation subsystem includes a memory 1306, the processor 1303, and a program that is stored in the memory and that is executable in the processor. When the program is executed by the processor, the methods in the foregoing embodiments are implemented. It should be noted that the memory 1306 may be non-volatile or volatile. The memory 1306 may be located in the modulation subsystem or may be located in the processing apparatus 1300 provided that the memory 1306 can be connected to the processor 1303.

Figure 14:
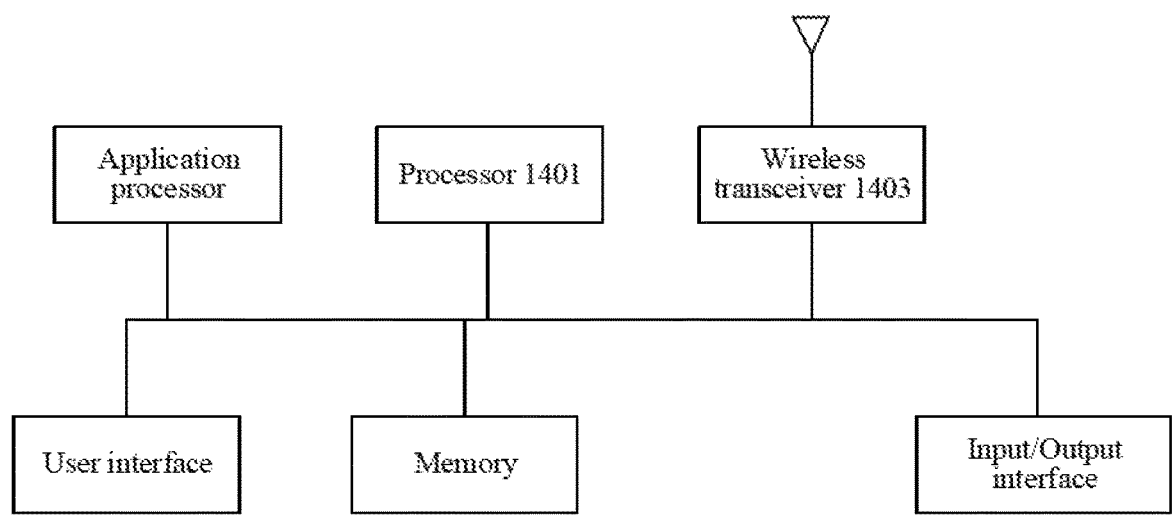
FIG. 14 is a schematic diagram of an architecture of another communications device according to an embodiment of this application.

When a communications device in an embodiment is a network device, reference may be made to the device shown in FIG. 14, and the device includes a processor 1401, an application processor, a memory, a user interface, and some other elements (including devices such as a power supply not shown). In FIG. 14, the processor may be the processor 1401, and implements a corresponding function. The sending unit and/or the receiving unit may be a wireless transceiver 1403 in the figure, and the wireless transceiver 1403 implements a corresponding function by using an antenna. It may be understood that the elements shown in the figure are merely examples, and are not necessary elements for completing the embodiments.

Figure 15:
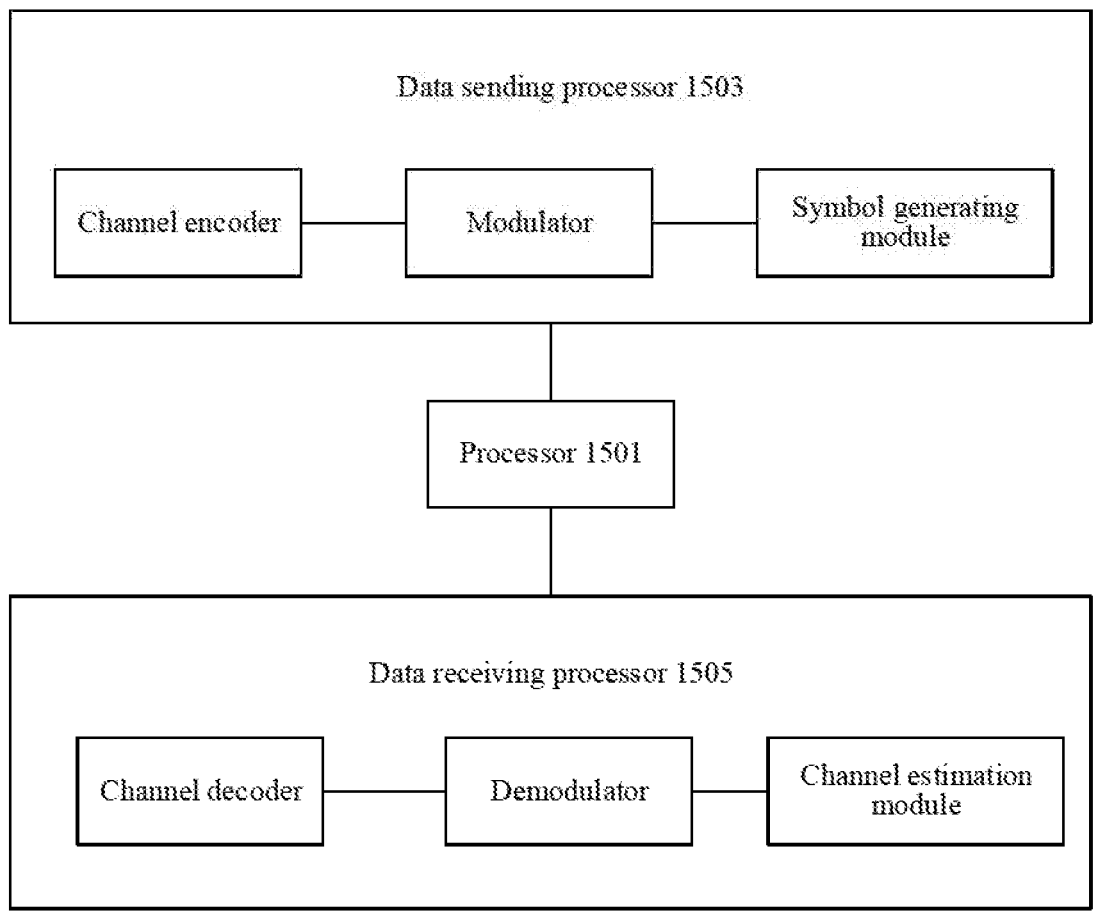
FIG. 15 is a schematic diagram of au architecture of another communications device according to an embodiment of this application.

When a communications device in an embodiment is a network device, reference may be made to a device in FIG. 15. For example, the device may implement a function similar to that of the processor in FIG. 14. In FIG. 15, the device includes a processor 1501, a data sending processor 1503, and a data receiving processor 1505. In FIG. 15, the processor may be the processor 1501, and implements a corresponding function. The sending unit may be the data sending processor 1503 in FIG. 15, and the receiving unit may be the receiving data processor 1505 in FIG. 15. Although a channel encoder and a channel decoder are shown in the figure, it may be understood that these modules are merely examples, and do not constitute a limitation on the embodiments.

Figure 16:
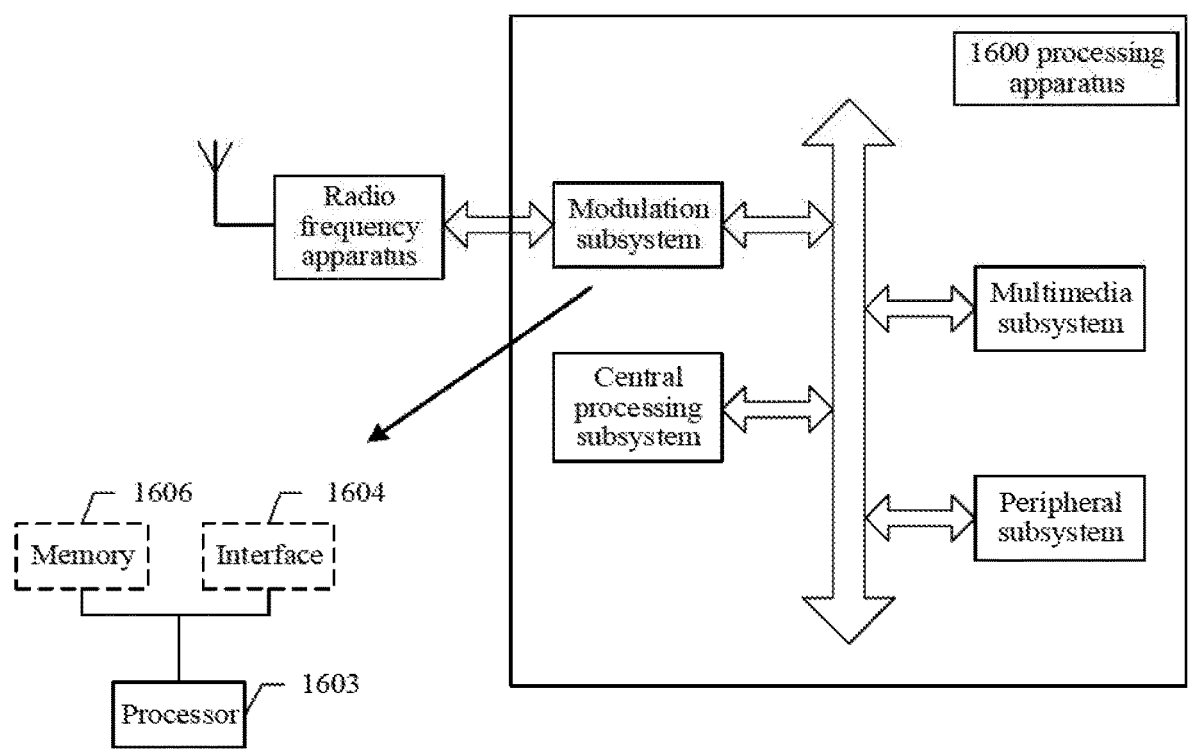
FIG. 16 is a schematic diagram of an architecture of a processing apparatus according to au embodiment of this application.

FIG. 16 shows another implementation of an embodiment. A processing apparatus 1600 includes modules such as a modulation subsystem, a central processing subsystem, and a peripheral subsystem. A communications device in this embodiment may be used as the modulation subsystem in the processing apparatus 1600. Specifically, the modulation subsystem may include a processor 1603 and an interface 1604. The processor 1603 implements a function of the processor and the interface 1604 implements functions of the sending units and/or the receiving units. In another variation, the modulation subsystem includes a memory 1606, the processor 1603, and a program that is stored in the memory and hat is executable in the processor. When the program is executed by the processor, the methods in the foregoing embodiments are implemented. It should be noted that the memory 1606 may be non-volatile or volatile. The memory 1606 may be located in the modulation subsystem or may be located in the processing apparatus 1600 provided that the memory 1606 can be connected to the processor 1603.

The processor in the embodiments may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component, and may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly performed and accomplished by rising a hardware decoding processor, or may be performed and accomplished by using a combination of hardware and software modules in a decoding processor. A software module may be located in a mature storage medium in the art, such as a random access memory (Random Access Memory, RAM), a flash memory, a read-only memory (Read-Only Memory, ROM), a programmable read-only memory, an electrically erasable programmable memory, a register, or the like. The storage medium is located in the storage, and the processor reads instructions in the memory and implements the steps in the foregoing methods in combination with hardware of the processor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the related art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a communications apparatus in a radio resource control (RRC)-connected state, a paging message, wherein the paging message is used to indicate that a broadcast information changes, the broadcast information comprises at least one of system information (SI), a master information block (MIB), a system information block (SIB) 1, or at least one specific SIB in other system information (OSI), the SI comprises the MIB, the SIB 1, and the OSI, and the at least one specific SIB in the OSI is a SIB associated with the communications apparatus; and
re-receiving, by the communications apparatus, a broadcast information based on the paging message,
wherein when the broadcast information comprises the SI, or when the broadcast information comprises the MIB, the SIB 1, and the at least one specific SIB in the OSI, the re-receiving, by the communications apparatus, the broadcast information based on the paging message comprises:
re-receiving, by the communications apparatus, a MIB from a PBCH (physical broadcast channel) in a synchronization signal block (SSB) based on the paging message;
re-receiving, by the communications apparatus, a SIB 1 from an initial bandwidth part (BWP) based on scheduling information of the SIB 1 comprised in the re-received MIB; and
re-receiving, by the communications apparatus, at least one specific SIB in OSI from the initial BWP or an active BWP based on scheduling information of the at least one specific SIB in the OSI comprised in the re-received SIB 1.

2. The method according to claim 1, wherein the re-receiving, by the communications apparatus, the MIB from the PBCH in the SSB based on the paging message comprises:
re-receiving, by the communications apparatus, the MIB from the SSB based on the paging message and a first time pattern, wherein the first time pattern is used to indicate a first moment and a first duration, the first moment is a start moment of each first switching period, at the start moment of the first switching period, the communications apparatus switches from the active BWP to the SSB, and a length of the first switching period is the first duration.

3. The method according to claim 2, wherein the first time pattern is determined based on a measurement GAP of the SSB.

4. The method according to claim 2, wherein the re-receiving, by the communications apparatus, the MIB from the SSB based on the paging message and the first time pattern comprises:
switching, by the communications apparatus, from the active BWP to the SSB in each first switching period based on the paging message and the first time pattern, until the communications apparatus re-receives the MIB from the SSB, or until a quantity of times that the communications apparatus switches from the active BWP to the SSB reaches a first preset value.

5. The method according to claim 4, wherein the method further comprises:
switching, by the communications apparatus, to the active BWP after re-receiving the MIB, and sending a second dedicated RRC message to a network device, wherein the second dedicated RRC message is used to indicate that the communications apparatus re-receives the MIB.

6. A communication method, comprising:
sending, by a communications apparatus, a paging message to a terminal device in a radio resource control (RRC)-connected state, wherein the paging message is used to indicate that a broadcast information changes, the broadcast information comprises at least one of system information (SI), a master information block (MIB), a system information block (SIB) 1, and at least one specific SIB in other system information (OSI), the SI comprises the MIB, the SIB 1, and the OSI, and the at least one specific SIB in the OSI is a SIB associated with the terminal device; and
resending, by the communications apparatus, a broadcast information to the terminal device,
wherein the resending, by the communications apparatus, the broadcast information to the terminal device comprises:
resending, by the communications apparatus, a MIB by sending a synchronization signal block (SSB), wherein the resent MIB comprises scheduling information of a SIB 1;
resending, by the communications apparatus, the SIB 1 on an initial bandwidth part (BWP) based on the scheduling information of the SIB 1, wherein the resent SIB 1 comprises scheduling information of at least one specific SIB in OSI; and
resending, by the communications apparatus, the at least one specific SIB in the OSI on the initial bandwidth part BWP or an active BWP based on the scheduling information of the at least one specific SIB in the OSI.

7. The method according to claim 6, wherein the method further comprises:
receiving, by the communications apparatus, a second dedicated RRC message, wherein the second dedicated RRC message is used to indicate that the terminal device re-receives the MIB.

8. The method according to claim 6, wherein the method further comprises:
receiving, by the communications apparatus, a third dedicated RRC message, wherein the third dedicated RRC message is used to indicate that the terminal device re-receives the SIB 1.

9. The method according to claim 6, wherein the method further comprises:
receiving, by the communications apparatus, a fourth dedicated RRC message, wherein the fourth dedicated RRC message is used to indicate that the terminal device re-receives the broadcast information.

10. An apparatus, comprising: one or more processors, and a computer-readable storage medium storing program instructions; wherein, when executed by the one or more processors, the instructions cause the apparatus to perform the following operations:
receiving, in a radio resource control (RRC)-connected state, a paging message, wherein the paging message is used to indicate that a broadcast information changes, the broadcast information comprises at least one of system information (SI), a master information block (MIB), a system information block (SIB) 1, and or at least one specific SIB in other system information (OSI), the SI comprises the MIB, the SIB 1, and the OSI, and the at least one specific SIB in the OSI is a SIB associated with the apparatus; and re-receiving, a broadcast information based on the paging message, wherein when the broadcast information comprises the SI, or when the broadcast information comprises the MIB, the SIB 1, and the at least one specific SIB in the OSI, the re-receiving, the broadcast information based on the paging message comprises:

re-receiving, a MIB from a PBCH (physical broadcast channel) in a synchronization signal block (SSB) based on the paging message;

re-receiving, a SIB 1 from an initial bandwidth part (BWP) based on scheduling information of the SIB 1 comprised in the re-received MIB; and re-receiving, at least one specific SIB in OSI from the initial BWP or an active BWP based on scheduling information of the at least one specific SIB in the OSI comprised in the re-received SIB 1.

11. The apparatus according to claim 10, wherein the re-receiving, the MIB from the PBCH in the synchronization signal block SSB based on the paging message comprises:

re-receiving, the MIB from the SSB based on the paging message and a first time pattern, wherein the first time pattern is used to indicate a first moment and a first duration, the first moment is a start moment of each first switching period, at the start moment of the first switching period, the apparatus switches from the active BWP to the SSB, and a length of the first switching period is the first duration.

12. The apparatus according to claim 11, wherein the first time pattern is determined based on a measurement GAP of the SSB.

13. The apparatus according to claim 11, wherein the re-receiving, the MIB from the SSB based on the paging message and the first time pattern comprises:

switching, from the active BWP to the SSB in each first switching period based on the paging message and the first time pattern, until re-receives the MIB from the SSB, or until a quantity of times that switches from the active BWP to the SSB reaches a first preset value.

14. The apparatus according to claim 13, switching, to the active BWP after re-receiving the MIB, and sending a second dedicated RRC message to a network device, wherein the second dedicated RRC message is used to indicate that the apparatus re-receives the MIB.

15. The apparatus according to claim 10, wherein re-receiving, the SIB 1 from the initial BWP based on scheduling information of the SIB 1 comprised in the re-received MIB comprises:

re-receiving, the SIB 1 from the initial BWP based on the paging message and a second time pattern, wherein the second time pattern is used to indicate a second moment and a second duration, the second moment is a start moment of each second switching period, at the start moment of the second switching period, the apparatus switches from the active BWP or the SSB to the initial BWP, and a length of the second switching period is equal to the second duration.

16. The apparatus according to claim 15, wherein the re-receiving, the SIB 1 from the initial BWP based on the paging message and the second time pattern comprises:

switching, from the active BWP or the SSB to the initial BWP in each second switching period based on the paging message and the second time pattern, until the apparatus re-receives the SIB 1 from the initial BWP, or until a quantity of times that the communications apparatus switches from the active BWP or the SSB to the initial BWP reaches a second preset value.

17. The apparatus according to claim 16, switching, to the active BWP after re-receiving the SIB 1, and sending a third dedicated RRC message to the network device, wherein the third dedicated RRC message is used to indicate that the apparatus re-receives the SIB 1.

* * * * *